United States Patent [19]
Friend et al.

[11] Patent Number: 5,455,901
[45] Date of Patent: Oct. 3, 1995

[54] INPUT DEVICE WITH DEFERRED TRANSLATION

[75] Inventors: John Friend, Pleasanton; Mike Freedman, Menlo Park, both of Calif.; Dan Bricklin, Newton Highlands, Mass.

[73] Assignee: Compaq Computer Corporation, Houston, Tex.

[21] Appl. No.: 304,415

[22] Filed: Sep. 12, 1994

Related U.S. Application Data

[60] and a continuation of Ser. No. 791,580, Nov. 12, 1991, abandoned.

[51] Int. Cl.[6] .................................................. G06T 7/00
[52] U.S. Cl. ........................ 395/149; 345/179; 382/187; 382/309
[58] Field of Search ............................. 395/148, 149; 364/419.02, 419.03, 419.04, 419.05, 419.14; 382/13, 57, 59; 345/156, 168, 173, 179

[56] References Cited

U.S. PATENT DOCUMENTS

| | | | |
|---|---|---|---|
| 4,860,372 | 8/1989 | Kuzunuki et al. | 382/13 |
| 4,914,709 | 4/1990 | Rudak | 382/57 |
| 4,972,496 | 11/1990 | Sklarew | 382/13 |
| 5,012,521 | 4/1991 | Endo et al. | 382/1 |
| 5,025,484 | 6/1991 | Yamanari et al. | 382/61 |
| 5,038,391 | 8/1991 | Yamaguchi | 382/59 |
| 5,040,227 | 8/1991 | Lyke et al. | 382/7 |
| 5,063,600 | 11/1991 | Norwood | 382/13 |
| 5,191,622 | 3/1993 | Shojima et al. | 382/13 |
| 5,276,794 | 1/1994 | Lamb, Jr. | 395/149 |

Primary Examiner—Heather R. Herndon
Assistant Examiner—Joseph H. Feild
Attorney, Agent, or Firm—Fish & Neave; Jeffrey H. Ingerman

[57] ABSTRACT

Improved data entry for handwriting entry computer systems, including "delayed translation" of written strokes, is provided. After a user has entered data into a handwriting entry computer system, the writing is associated with a target field or object. In one embodiment of the invention, a translation of the entered data is performed, and the untranslated "ink" is displayed. At a later time, if desired, the user can elect to display the translated text. If there are errors or mistranslations, the user can make corrections or revert back to the ink. In another embodiment, a user enters data into the computer system. A translation of the data is performed by a background process. If any of the characters cannot be translated, the original ink is displayed. If all of the characters are translated, the resultant word is compared to a dictionary of words, numbers and symbols. If the resultant translated word does not match a dictionary entry, the original ink is displayed. If there is a match, the translated text is displayed. In another embodiment, the user can selectably choose between translated text and the original ink on a field by field basis.

29 Claims, 8 Drawing Sheets

INPUT DEVICE WITH DEFERRED TRANSLATION

This is a continuation of application Ser. No. 07/791,580, filed Nov. 12, 1991, entitled *INPUT DEVICE WITH DEFERRED TRANSLATION*, abandoned.

BACKGROUND OF THE INVENTION

1. Field of the Invention

The present invention relates to the field of data entry in computer systems.

2. Background Art

A typical computer system consists of a central processing unit (CPU), main memory such as random access memory (RAM), a data entry device, including a positioning device, a mass storage device such as one or more disk drives, a display and/or a printer. In the prior art, the data entry device often consists of a keyboard, on which a user enters data by typing. The positioning device of a prior art computer system may consist of a "mouse" or other cursor positioning device.

Computer systems have also been developed that are directed to handwritten data entry rather than keyboard data entry. These systems are often characterized by the use of a pen, stylus, or other writing device, to enter handwritten data directly on the display of the computer system. Alternatively, these systems may provide for a user to enter data on a digitizing tablet or other input device, with the image of the written input displayed on a separate computer display output device. The writing device for entering handwritten or freestyle stroke input information is not limited to a pen or stylus, but may be any input device such as a mouse, trackball, pointer, or even a person's fingers. Such systems are not necessarily limited to receiving data generated by human users; for example, machine generated data may also be inputted and accepted to such systems.

One class of this handwriting entry computer system that receives handwritten data input is referred to as a "pen based" computer system. In a pen based computer system, a writer can input information on a display by "writing" directly on the display. A writing device, such as a pen or stylus, is used to enter information on the display. In a typical pen-based computer system, a user touches the stylus to the display and writes as he would on a piece of paper, by making a series of pen strokes to form letters and words. A line appears on the display that follows the path of travel of the pen point, so that the pen strokes appear on the display as ink would appear on a handwritten page. Thus, the user can enter information into the computer by writing on the display. These strokes are referred to herein as "ink". A related series of strokes or characters are referred to as a "block of ink".

In addition to handwriting, special functions based on input strokes are supported on pen based computer systems. For example, a writer may strike certain previously entered handwritten input by making the strokes of an "X" over the entry. These special functional strokes or actions are referred to herein as "gestures". Pen based computers typically have a display surface that serves as both an input receiving device and as an output display device.

The display of a pen-based entry or other handwriting entry computer system may have bordered regions called "fields" that define locations or areas where data is to be entered, or that are associated with particular actions. For example, if the software application provides a data entry display that is an information form with fields for "First Name", "Last Name", "Age", "Occupation", etc., certain information is generally associated with each field. These locations are referred to here as "objects" or "fields". Each object has a boundary associated with it. When data is entered, the computer must determine which object is to be associated with the writing or gesture. The object intended to be associated with the data input is called the target object. The process of identifying the target object is referred to here as targeting. The method and apparatus that performs the function of targeting is referred to here as a targeting system.

One characteristic of handwriting entry computer systems is the ability to translate original handwritten strokes of ink or blocks of ink into machine readable words or characters for display. This translation is accomplished via a "character recognition" algorithm. The strokes of ink that form handwritten words are translated into, for example, ASCII characters. After the translation, the appearance of the displayed characters is as if they had been typed in via a keyboard.

To translate a handwritten character into a machine readable character, the handwritten character is compared to a library of characters to determine if there is a match. A description, or "template" for each character is defined and stored in memory. Handwritten characters are compared to the stored templates. Match coefficients, reflecting how closely a handwritten character matches the template of a stored character, are calculated for each template character. The template character with the highest match coefficient is identified. The character represented by this template provides the "best fit" for the handwritten character. If the match coefficient for the "best fit" character exceeds a predetermined minimum threshold., the "best fit" character is adopted. If the match coefficient for the "best fit" character is less than the minimum threshold value, no translation is done. If the handwritten character cannot be translated, the character must be re-entered.

A disadvantage of current character recognition algorithms is limited accuracy. Often, handwritten characters are not translated at all or are mistranslated as an ASCII character other than the handwritten character. The mistranslated character must then be rewritten by the user, sometimes repeatedly, until a correct translation is made.

A number of prior art handwriting recognition and translation schemes have been described in United States patents. These prior art schemes are described below.

Fukunaga, U.S. Pat. No. 4,641,354, is directed to an apparatus for recognizing and displaying handwritten characters and figures. The apparatus includes a stylus, a liquid crystal display, and handwritten character and figure recognition means, based upon input stroke information. The Fukunaga system displays the result of recognition as it is completed, erasing from the display screen the stroke information used for recognition, and retaining on the display the stroke information which has not yet been used for recognition. Fukunaga discusses the use of a character recognition algorithm that converts handwritten text as soon as the algorithm determines that the stroke information for a character is completed. To conserve memory, all handwritten information is erased from the display as soon as it is recognized.

Conoval, U.S. Pat. No. 4,703,511, is directed to a handwriting input apparatus and method of determining handwriting dynamics information. The Conoval system uses a portable unit and a code generating stylus that modulates handwriting markings, thereby embedding time code information within the writing path. The coded markings are delivered to the writing surface via electromechanical, electrothermal, or electrostatic printhead devices. After the writing is produced, an image detection means may convert the written image to an electrical signal representation thereof for further dynamic analysis. The writing device of Conoval emits a modulated signal which is memorialized on the writing surface as the user hand writes text. Temporal information is stored in the strokes comprising the handwritten characters. The handwritten characters are displayed as they are written. However, the characters are not line-segmented. Conoval suggests that the writing surface, on which the characters are written, can later be provided to a character recognition algorithm for conversion to typewritten fonts.

The system described in More, U.S. Pat. No. 4,839,634, is a portable electro-optic data input/output, storage, processing, and display device responsive to hand printed text and hand drawn graphics. The More system incorporates a character recognition method optimized for automatic and computationally efficient on-line recognition of hand printed text characters. Hand printed text characters are stored in a compact and standard format, like ASCII, for later display, processing or output to external equipment. In one preferred embodiment, the user places hand printed characters into a text conversion area, where they are recognized, converted to typewritten fonts on a line-by-line basis, and displayed in a document viewing/processing area. With the device of More, a user hand writes a line of characters in a text conversion area. The characters are displayed in this area as they are written. When the user activates a "CONVERT" button on the device, the entire line of handwritten text is operated on by a character recognition algorithm. Any handwritten characters in the text conversion area are erased. The recognition output is displayed as typewritten fonts in a larger, separate document viewing/word processing area. All editing functions are performed on the typewritten fonts in a display area which is separate from the area where data is inputted. Even though character recognition does not take place until the user initiates the recognition algorithm, the user can enter only a single line of unconverted text at a time. More does not allow the user to work with and perform functions on the untranslated handwritten characters. Further, the user is prompted to correct any translating errors as each line is converted. More requires untranslated, handwritten characters to be resident in a specific and limited region.

A portable keyboardless entry computer system is described in Sklarew, U.S. Pat. No. 4,972,496. The invention in Sklarew temporarily displays the hand printed characters and then translates them into pre-selected fonts by way of a character recognition algorithm. The user is prompted to make any corrections to handwritten data as it is being inputted. The system in Sklarew also includes a word processing editor. The portable unit described in Sklarew also suffers from some of the disadvantages of Fukunaga. The device of Sklarew concurrently displays handwritten text and the result of its recognition algorithm on the screen. The user is prompted to correct any errors before the translated characters are permanently transferred to the screen.

Shojima U.S. Pat. No. 4,718,103, and Jeanty, U.S. Pat. No. 5,001,765, are both specifically related to character recognition algorithms.

A disadvantage of the prior art translation systems is that the character recognition and translation functions are invoked in real time, immediately after entry of a handwritten word. When the characters are not translated correctly, the user is prompted to correct the translation or reenter the handwritten data. This interrupts the flow of data entry, increasing data entry time, frustrating the user, and decreasing the usability of handwriting entry computer systems.

SUMMARY OF THE INVENTION

The present invention provides for improved data entry for handwriting entry computer systems by disabling the automatic display of a translation of the entered data. Instead, the original ink entered as data is displayed. This is referred to here as "deferred translation". The invention allows a user to select modal deferred translation, automatic deferred translation, and/or manual deferred translation.

Modal deferred translation provides for the automatic display of original ink input in all cases. A translated version of the input data is generated and retained. The user may elect to display either the original ink or the translated text at a later time. In operation, a user enters data into a handwriting entry computer system, and the writing is associated with a target field or object. A translation of the entered data is performed and the untranslated "ink" is displayed. At a later time, if desired, the user can elect to display the translated text. If there are errors or mistranslations, the user can make corrections or revert back to the ink.

Automatic deferred translation provides for the display of the original ink whenever there are errors in the translated text. If there are no errors in the translated text, it is displayed instead of the original ink. In operation, a user enters data into the computer system, and a translation of the data is performed. If any of the characters cannot be translated, the original ink is displayed. In an optional step, if all of the characters are translated, the resultant word is compared to a dictionary of words, numbers and symbols. If the resultant translated word does not match a dictionary entry, the original ink is displayed. If there is a match, the translated text is displayed.

In manual deferred translation, a user enters data, and a translated version of the data is displayed. The user may elect to correct the translated text, if necessary, display the original ink instead, or do nothing. This decision can be made on a field by field basis.

The present invention retains both the original ink and translated text so that a user can elect to display either version as desired.

DETAILED DESCRIPTION OF THE INVENTION

A method and apparatus for providing deferred translation of data entered into a computer system is described. In the following description, numerous specific details, such as processor type, processor speed, operating system type, etc. are set forth in detail to provide a more thorough description of the present invention. It will be apparent, however, to one skilled in the art, that the present invention may be practiced without these specific details. In other instances, well known features have not been described in detail so as not to unnecessarily obscure the present invention.

The preferred embodiment of the invention is incorporated in computer software for use, for example, with the PenPoint™ operating system for pen-based computers, such as those manufactured by GO™ Corporation of Foster City, Calif. However, the invention can be used with a wide variety of other operating systems and other computers and computer systems.

Figure 1:
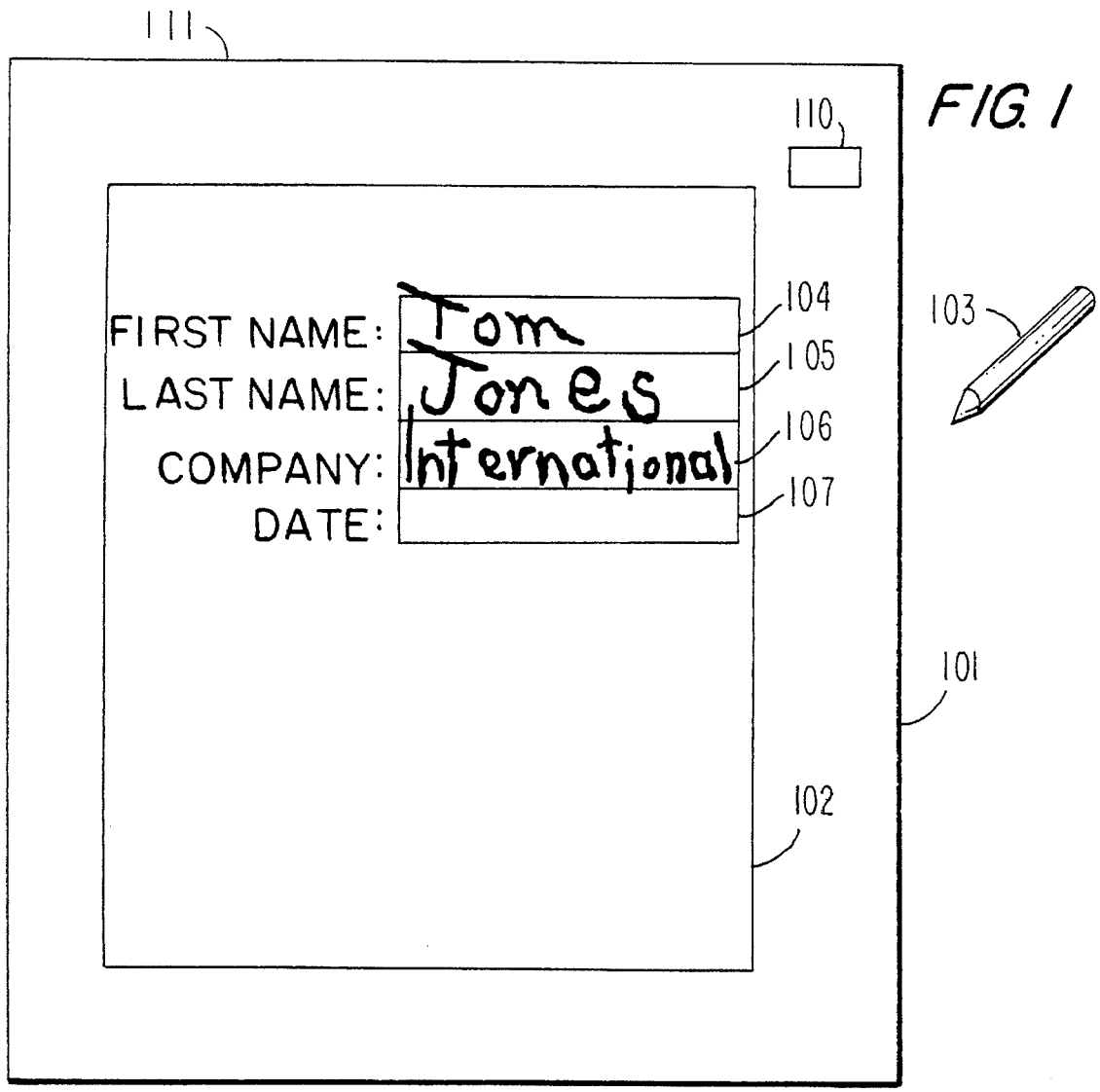
FIG. 1 illustrates a handwriting entry computer that may be used with the present invention.

FIG. 1 illustrates an example of a handwriting entry computer of a type that may be used with the present invention. It consists of a pen sensitive display 102 disposed in a housing 101. The front of-the housing features an on/off button 110. Input/output ports for a disk drive, communications, and a printer, a power supply socket, and a contrast control (not visible) are located along the top 111 of housing 101.

The display 102 senses the position of a special stylus 103 when the tip of the stylus is adjacent to the display. The display 102, for example, shows as display output, the outline of a form for data entry. This form can be generated, for example, by an application program running on the pen based computer system. The form may include a number of objects or fields. For example, in the example of FIG. 1, the form includes the "First Name" field 104, the "Last Name" field 105, the "Company" field 106 and the "Date" field 107. A user may write data directly in one or more of the fields using the stylus 103. For example, the name "Tom" is entered in the "First Name" field 104, the name "Jones" is entered in the "Last Name" field 105, and the name "International" is entered in the "Company" field 106.

Internally, the computer of FIG. 1 uses an Intel 80286 microprocessor chip running at 12 Mhz or more. Any suitable processor may be used with the present invention. Preferably, at least four megabytes of random access memory (RAM) is included..

"Gestures" are simple types of one or two stroke pen movements that invoke certain specified commands. The present invention utilizes approximately a dozen standard "gestures" that form part of its user interface. Examples of these "gestures" are left and right brackets ("[" and "]"), often used for selecting words or a section of text, an up-caret ("^"), for accessing an editing pad that can be used for data entry, single strokes or "flicks" right, left, up or down, which are used for scrolling, and "taps" or "presses" which are used to invoke commands.

The operating system of the preferred embodiment of the present invention also provides data to an application about any writing that is done on the display with the stylus. The operating system records events such as "pen down", "pen up", pen position, and pen movement, and makes the record of such events available to applications running on the computer system.

Figure 2C:
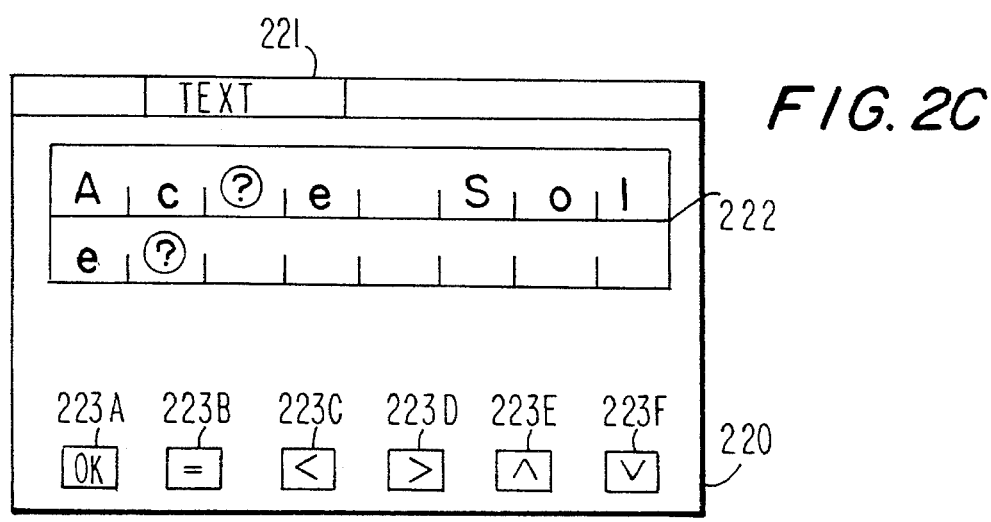
FIG. 2A–2C illustrates the entry of data and the correction of data in the preferred embodiment of the present invention.
Figure 2A:
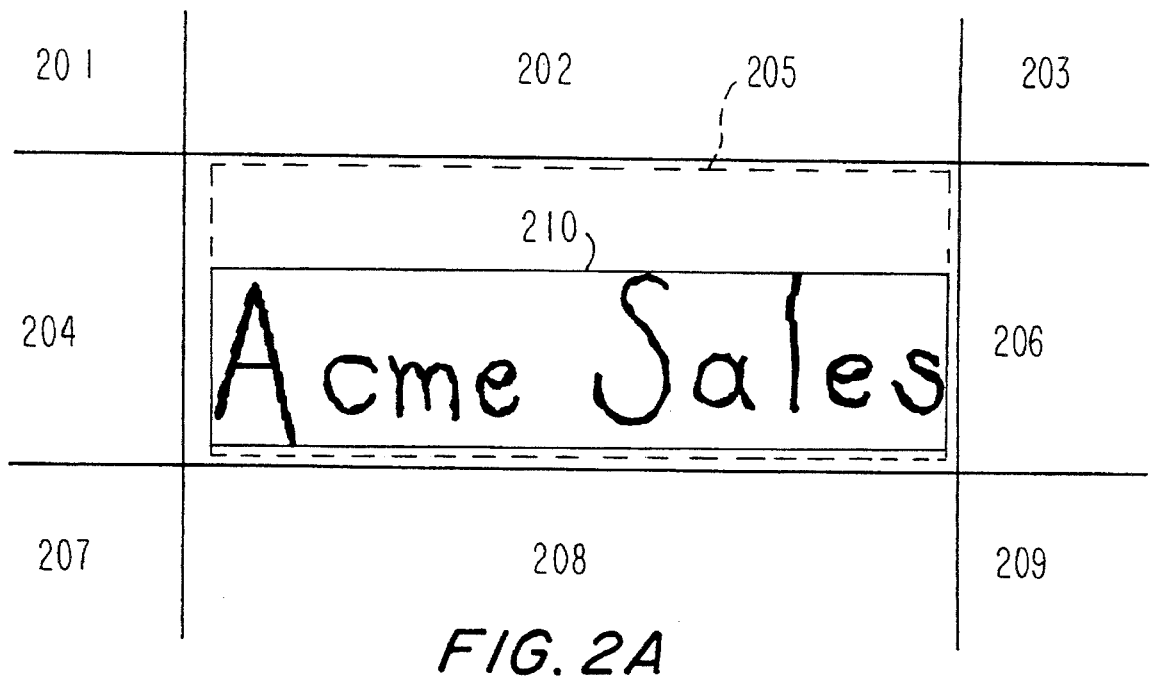
Figure 2B:
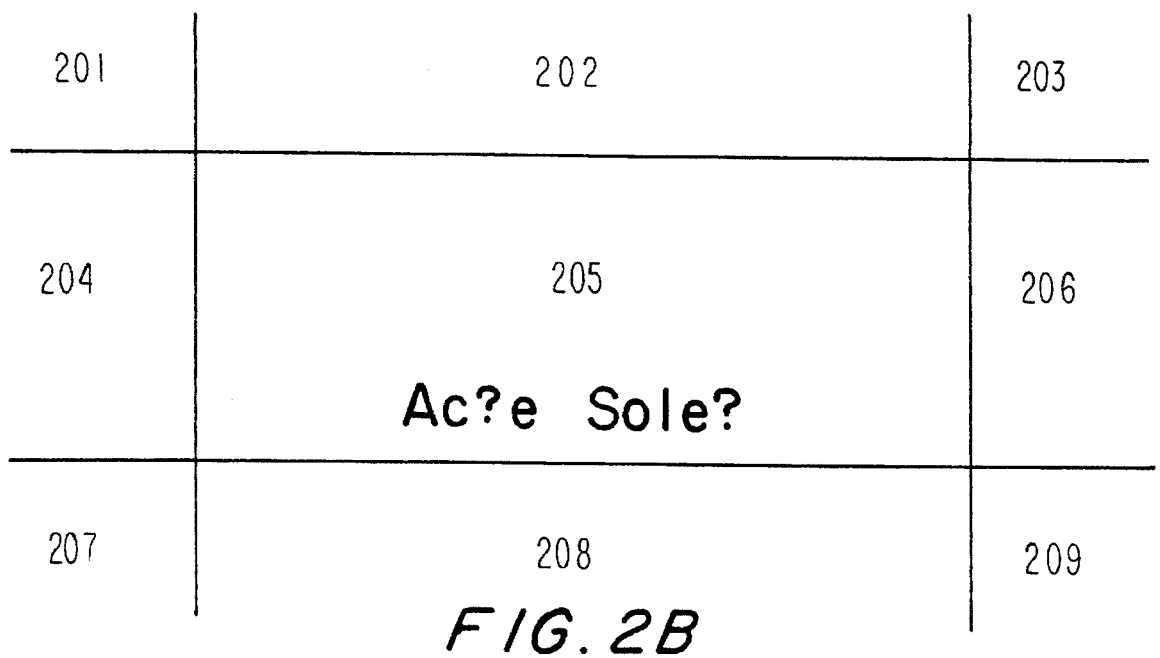

An example of the entering and translation of data in a handwriting entry computer system is illustrated in FIGS. 2A–2C. Referring first to FIG. 2A, an array of fields 201–209 is illustrated. These fields are areas of a display or data entry means that are to be associated with particular data. In the example of FIG. 2A, the boundaries between the fields are illustrated. In actual implementation, however, it is not required that the boundaries be displayed. In the example, a user has written the words "Acme Sales" into field 205. After a user has written a block of ink, such as the words "Acme Sales", the block of ink is targeted to a target field. One method of targeting is described in U.S. patent application copending, commonly-assigned Ser. No. 07/819, 450, filed Jan. 10, 1992 entitled "Targeting.".

In this scheme, the bounds of the smallest rectangle that contains all of the strokes in the block is determined. This bound is shown as bound 210 surrounding the strokes that comprise the word "Acme Sales" in FIG. 2A. The area overlap between the bounded rectangle and every object or field touched by the rectangle is calculated. If a preselected threshold percentage of the bounded rectangle overlaps a single field or object, that field or object is identified as the target. If no one field or object is overlapped by at least the preselected percentage area of the bounded rectangle, bounding rectangles are defined for each character or stroke in the block of data. The amount of overlap of the bounded characters is determined, and the field having the greatest area of overlap is identified as the target field.

Any suitable targeting scheme may be utilized without departing from the scope of the present invention. For example, in an alternate embodiment, a bounded rectangle is generated for the data block and the center of the rectangle is determined. The object overlapped by the center of the writing rectangle is identified as the target object.

After the block of ink has been targeted, a translation is performed to translate the strokes and characters of ink into translated text. In the preferred embodiment, the strokes are translated into characters (e.g., Unicode or ASCII). This translation can be performed using any of several well known translation algorithms. In one embodiment of the present invention, a multi-tiered translation scheme is employed. This scheme is described in U.S. patent application Ser. No. copending, commonly-assigned Ser. No. 07,795,009, filed Nov. 18, 1991, entitled "Method for Entering and Manipulating Spreadsheet Cell Data" assigned to the assignee of the present invention.

Fields in the present invention may be one of three types of data formats: text, numbers, or "ink". A field may be designated as having a particular format prior to data being entered in the field. That is, a field may be designated to be a "text" field, a "value" field, or an "ink" field. In the preferred embodiment of the present invention, designating a field a particular format does not preclude data having a different format from being entered into the field. It does, however, indicate what kind of data is expected to be entered into the field, thereby aiding the character-recognition process.

Regardless of the translation scheme used, there can sometimes be errors in the translation. These errors can take the form of untranslatable characters or mistranslated characters. After a translation is attempted, the translation results are displayed to the user. Referring to FIG. 2B, the attempted translation of "Acme Sales" is displayed as "Ac?e Sole?". The translation system correctly recognizes the "A", "c" and "e" of "Acme" and the "S", "l" and "e" of "Sales". It is unable to recognize the "m" of "Acme" and the "s" of "Sales", and incorrectly translates the "a" in "Sales" as an "o". A question mark "?" is used to represent an untranslatable character.

After the system has displayed the translation, the user may seek to correct the translation, if necessary. This is accomplished by invoking an "editing pad" for the translated text.

FIG. 2C illustrates an embodiment of an editing pad that can be invoked to correct the entry in field 205 of FIG. 2B. The editing pad 220 shown in FIG. 2C consists of a rectangular box containing a format display 221 that indicates the format of the field (in this case, Text), an entry display 222 that displays the content of the field in a format based on the designated format of the field, and navigation buttons 223A to 223F that are used to, for example, accept an edited entry.

To edit the field entry, corrections are made with the stylus by writing on the entry display 222. Entry display 222 illustrates the existing field content in a format that depends on the format of the field. The format of field 205 is Text. For a field that has a text format, the field content is displayed on a character by character basis in translated form, to the extent translation is possible. The same multi-tiered recognition process described above for translating handwritten field entries is used, with the following two exceptions: (1) an entry is treated on a character by character basis, rather than as a whole, such that each recognized character is displayed regardless of whether other characters are recognized and regardless whether all characters of an entry have the same format (or, in the case of a text entry, whether the entry is found in a dictionary) and (2) if a character is not recognized, a question mark ("?") is displayed in lieu of that character.

To correct the entry, the correct characters are handwritten over the incorrect or unrecognized characters. To replace the "?" in "Ac?e", an "m" is written over the "?" with the stylus. Occasionally, a character must be corrected more than once before the proper translation is made. The same process used to correct the "?" in "Ac?e" can be used to correct the "o" and the "?" in "Sole?".

The need to correct translation errors interrupts the flow of data entry in prior art handwriting entry computer systems. The present invention eliminates the need to correct translation errors by enabling the user to elect to display only the original ink as data is entered. This is referred to here as "deferred translation". The translation of entered data may take place in a background process, but only the original ink is displayed. At a later, more convenient time, the user can elect to display translated text and perform corrections, if necessary, at that time.

The present invention provides a number of methods for disabling the automatic display of translated text. These methods are referred to as "modal deferred translation", "automatic deferred translation", and "manual deferred translation". These methods are described below.

Modal Deferred Translation

A user may wish to prevent or disable the automatic display of translated text that is characteristic of prior art handwriting entry computer systems. For example, a user may wish to disable the automatic display of the translation of ink when entering large volumes of data, or sequentially entering data as part of completing a sales order form, inspection sheet, medical history form, when entering data quickly, or in any other situation where the automatic display of translated text is a barrier to data entry.

One method provided by the present invention to disable automatic translation of ink to translated text is referred to here as "modal deferred translation". In modal deferred translation, the data entry system is configured so that no translated text is displayed unless specifically requested by the user. When modal deferred translation is enabled, only ink strokes and characters are displayed for all fields into which data may be entered.

Figure 3:
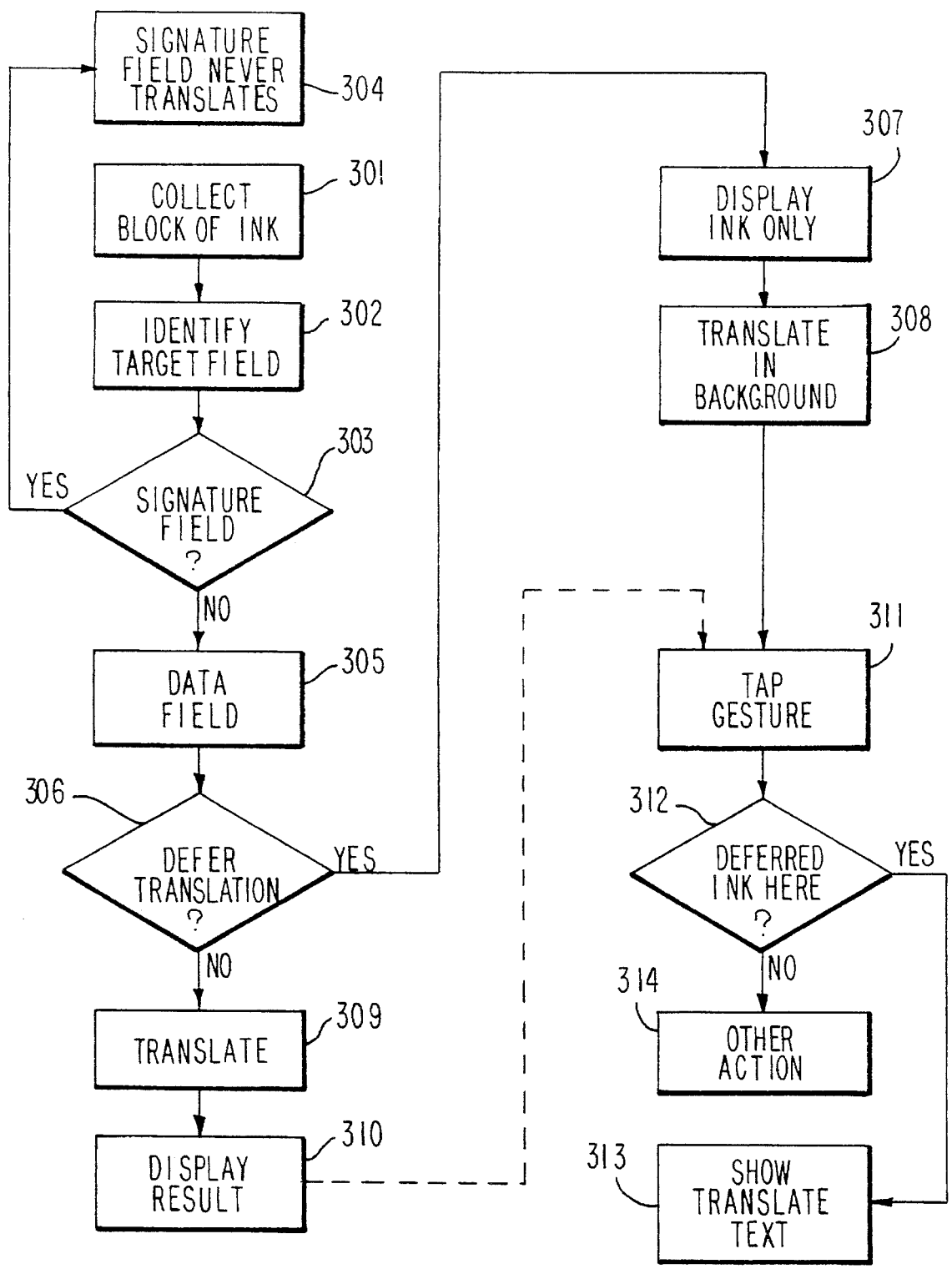
FIG. 3 is a flow diagram of the operation of the present invention.

FIG. 3 is a flow diagram illustrating the operation of modal deferred translation using the present invention. At step 301, a block of ink is collected. At step 302, the block of ink is targeted and the appropriate target field is identified. At decision block 303, the argument "signature field?" is made. If the argument is true, the system proceeds to step 304. A signature field is never translated. A signature field is reserved for written signatures and other items that are to remain in the written form.

If the argument at decision block 303 is false, the system proceeds to step 305 and the field is identified as a data field. At decision block 306, the argument "defer translation?" is made. If the argument is true, the system proceeds to step 307 and the block of ink is displayed as ink only. At step 308, the block of ink is translated so that if the user subsequently wishes to display the translated characters, they are available.

If the argument at decision block 306 is false, the block of ink is translated at step 309 and the result is displayed at step 310. After either of steps 310 or 308, the user may, at step 311, initiate a gesture at the target field associated with the block of ink. This gesture may be a "tap" gesture, where the stylus or data entering device is tapped once over the target field. The gesture may be translated by a multi-tiered translation process. Alternatively, another gesture or activating means may be used.

At decision block 312 the argument "Deferred ink here?" is made. This argument determines if the contents of the target field are currently displaying ink or translated text. If the argument is true, meaning the target field is displaying ink, the system proceeds to step 313 and the ink is replaced with the translated text. The translated text may or may not have errors that require correction at this time. The user may elect to make corrections if necessary, or may elect to redisplay the ink. This can be accomplished by initiating the tap gesture (or its equivalent), or by some other activating means. If the argument at decision block 312 is false, the system proceeds to step 314 and some other action is taken. This action may be the provision of an editing pad to aid in the correction of the translated text. Alternatively, another action or actions may be taken.

Modal deferred translation may be enabled by selecting and activating a menu command or its equivalent. The user may also use a menu command to disable manual deferred translation. In one embodiment of this invention, when modal deferred translation is disabled, subsequent entry of strokes and characters are automatically translated. Ink that had been entered while the computer system was in modal deferred translation remains displayed as ink until the user selectively indicates, on a field by field basis, that the translated text for that target field is to be displayed.

In another embodiment of this invention, when modal deferred translation is disabled, all strokes and characters that had been entered while the computer system was in modal deferred translation are displayed as translated text. The user may, on a field by field basis, elect to display the original ink instead.

Automatic Deferred Translation

In some circumstances, the user may wish for the translated text to be automatically displayed, but only if it is a correct translation. Otherwise, the user prefers that the original ink be displayed instead. The present invention provides a method, referred to here as "automatic deferred translation", in which translated text is reviewed for untranslatable characters or for mistranslated words or characters. Only if there are no translation errors is the translated text displayed. Otherwise, the original ink is displayed.

The present invention provides a two part test to implement automatic deferred translation. After the translation process has been performed, the translation is reviewed. If there are any untranslatable characters, the translated text is not displayed. In an optional step, if each character has been translated, the word is compared to entries in a dictionary. If the translated block is not found in the dictionary, it is assumed that a mistranslation has occurred and the original ink is displayed. The dictionary may be a system dictionary or a user-selected dictionary.

Figure 4:
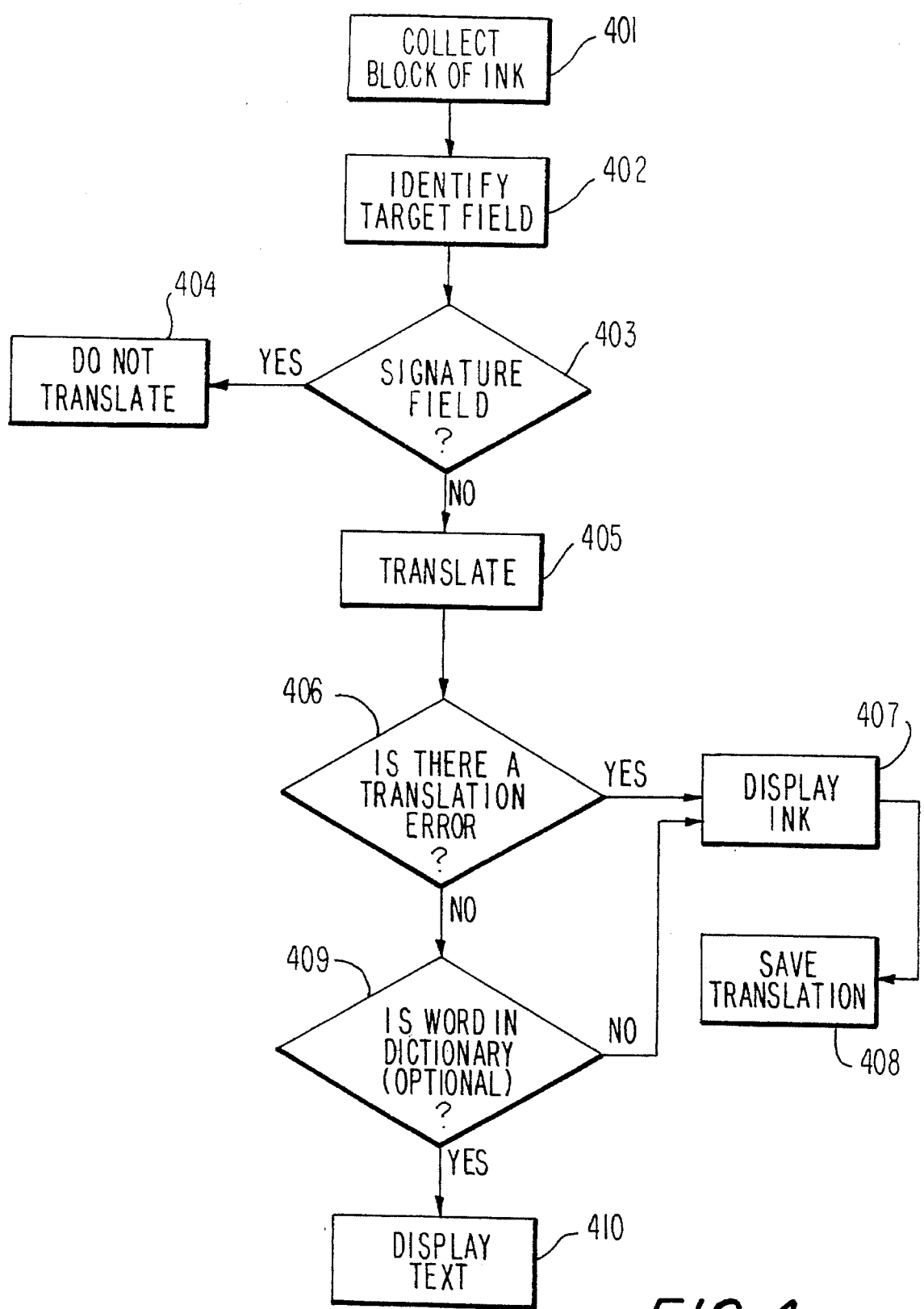
FIG. 4 is a flow diagram of automatic deferred translation in the present invention.

FIG. 4 is a flow diagram illustrating automatic deferred translation in the present invention. At step 401, a block of ink is collected. At step 402, the target field of the block of ink is identified and the block of ink is associated with the target field. At decision block 403, the argument "signature field?" is made. If the argument is true, the system proceeds to step 404 and no translation takes place. If the argument at decision block 403 is false, the system proceeds to step 405 and the block of ink is translated, (translation may be performed in the background).

At decision block 406, the argument "is there a translation error?" is made. That is, whether one or more strokes or characters are untranslatable. If the argument at decision block 406 is true, the system proceeds to step 407. At step 407, the ink is displayed and at step 408 the attempted translation is saved for future use.

If the argument at decision block 406 is false, the system displays the text. In an optional step, the system proceeds to decision block 409. At decision block 409, the argument "Is word in dictionary?" is made. If the translated word, although having no untranslatable characters, is not found in the dictionary, i.e., the argument is false, the system returns to step 407 where the ink is displayed and the translation is saved. If the argument at step 409 is true, an acceptable translation has been made and the text is displayed at step 410.

Automatic deferred translation can be enabled and disabled by a menu command or some other suitable activation means. In one embodiment, after automatic deferred translation is disabled, target fields displaying ink continue to display ink. The user can select the attempted translations on a field by field basis. In another embodiment, all fields display translated text when automatic deferred translation is disabled. The user can select the original ink on a field by field basis.

Manual Deferred Translation

The present invention also provides a method that allows the user, on a field by field basis, to display the translated text or the original ink. This method is referred to here as "manual deferred translation". In manual deferred translation, the user is first shown the attempted translation of the original ink. If the user elects, the translated text is displayed and the user may make corrections as necessary. The user, after viewing the translated text, may elect to display the original ink and correct or display the translated text at a later time.

Figure 5:
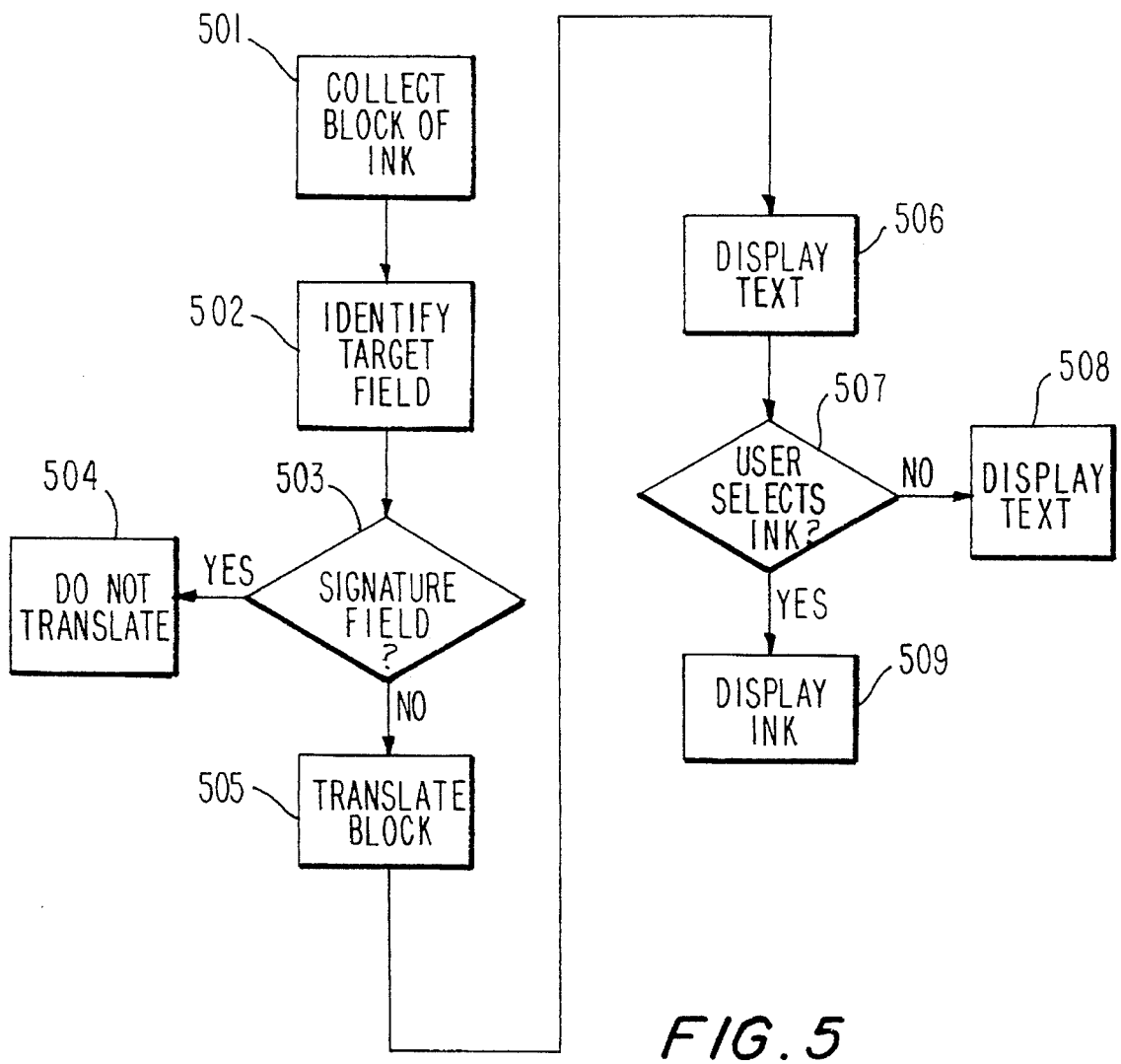
FIG. 5 is a flow diagram of manual deferred translation in the present invention.

FIG. 5 is a flow diagram illustrating the manual deferred translation scheme of the present invention. At step 501, a block of ink is collected. At step 502, the target field of the block of ink is identified and the block of ink is associated with the target field. At decision block 503, the argument "signature field?" is made. If the argument is true, the system proceeds to step 504 and there is no translation of the block of ink. If the argument is false, the system proceeds to step 505 and the block of ink is translated.

At step 506, the translated text is displayed. At this point, the user may determine to display the original ink or the translated text. At decision block 507, the argument "user selects ink?" is made. If the argument at decision block 507 is false, the system proceeds to step 508 and the text is displayed if the argument at decision block 507 is true, the system proceeds to step 509 and the original block of ink is displayed in the target field.

In one embodiment of this invention, manual deferred translation is always enabled, and the user may elect at any time to display the original ink instead of the translated text. This is true even if the user has "approved" the translated text. The original ink is retained and associated with the target field so that the user may redisplay it at any time.

Generation of Block of Ink

Figure 6:
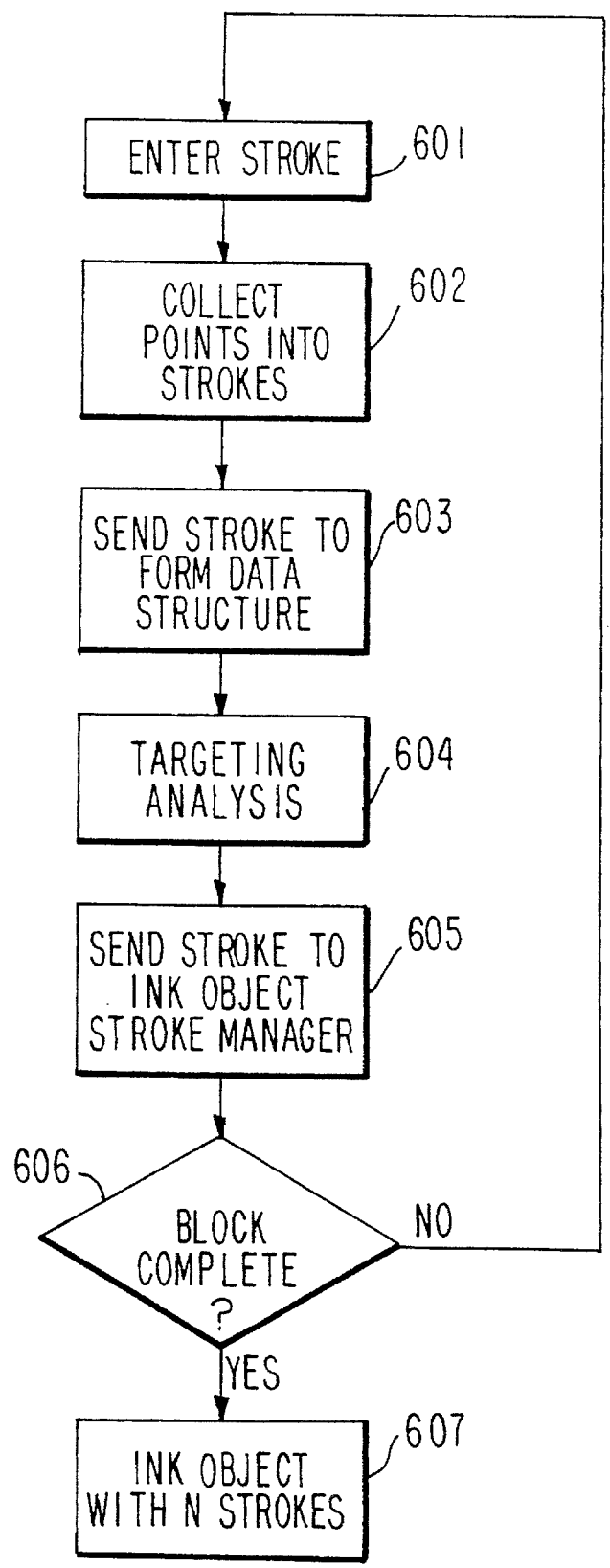
FIG. 6 is a flow diagram of the steps used to generate an ink object in the present invention.

FIG. 6 illustrates a flow diagram of the generation of a block of ink. At step 601, a stroke is entered as data. (A stroke is defined here as the the ink entered between a pen down event and a pen up event). At step 602, the motion of the pen is sampled periodically so that point locations and deltas between point locations are determined. These points are collected to define a stroke. At step 603, the stroke data is forwarded to a data structure form.

At step 604, a preliminary targeting analysis for the individual stroke is performed. At step 605, the stroke is sent to an ink object stroke manager. The ink object stroke manager collects strokes and combines them into blocks of strokes as required. At decision block 606, the argument "block completed?" is made. This argument is used to determine when a stroke is to be associated with a current block of strokes or if a new block of strokes is being generated. If the argument at decision block 606 is false, the system returns to step 601 and another stroke is generated. If the argument is true, the system proceeds to step 607. At step 607, an ink object having n strokes is created. This ink object is the collected block of ink referred to in the initial steps of the flow charts of FIGS. 3–5.

Branching of Fields

A number of steps may occur prior to the determination that text has been entered into a field. The present invention first determines the type of field that is being written to and whether that field has restrictions as to the type of data that can be entered into the field. The present invention also determines whether the writing is a gesture to take an action related to the field or is data to be entered into the field.

Figure 7:
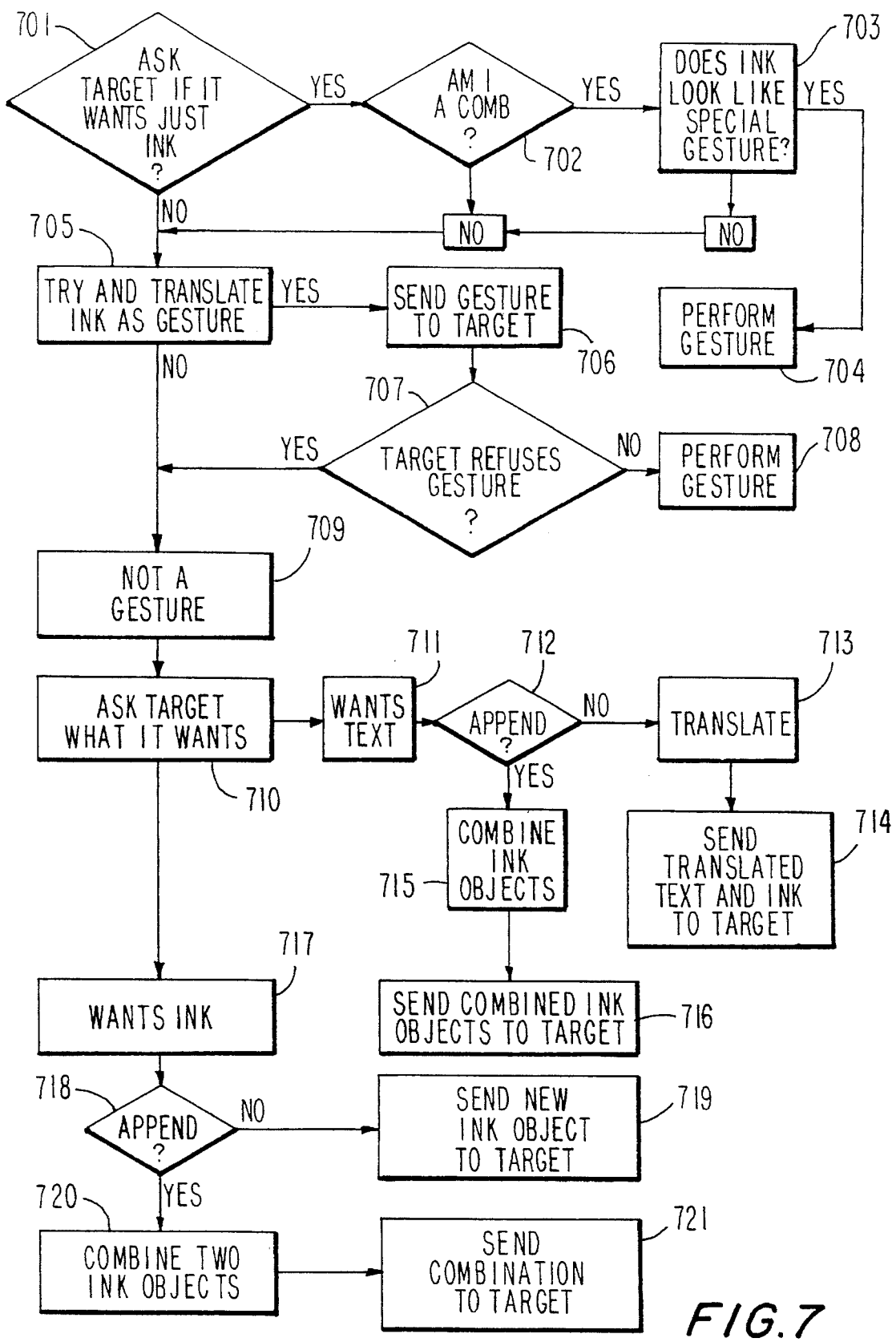
FIG. 7 is a flow diagram of the operation of the present invention for branching of fields.

FIG. 7 is a flow diagram illustrating the operation of the present invention in connection with querying fields as to their type and determining if a series of strokes comprise a gesture or data. At decision block 701, after a block of ink has been collected, the argument "Ask target if it wants raw ink?" is made. This determines if the target field is an ink-only field or not. If the argument at decision block 701 is true, the system proceeds to decision block 702. (One type of field that requests raw ink is a comb field such as illustrated in FIG. 2C). At decision block 702 the argument "Is target field a comb?" is made. If the argument at decision block 702 is true, the system proceeds to decision block 703 and the argument "Does ink look like special gesture?" is made. A comb field accepts a number of gestures in addition to the gestures accepted by non-comb fields. This step is used to determine if one of the additional gestures is being invoked in the comb field. If the argument at decision block 703 is true, the system proceeds to step 704 and the gesture is performed.

If the argument at any of decision blocks 701, 702 or 703 is false, the system proceeds to block 705. At step 705, an attempt is made to translate the ink as a gesture. If the ink does represent a gesture, the system proceeds to step 706 and the gesture is sent to the target field. The target field may refuse the gesture or it may accept the gesture. At decision block 707, the argument "Target refuses gesture" is made. If the gesture is not refused, the system proceeds to step 708 and the gesture is performed. If the argument at decision block 707 is true, the system proceeds to block 709 where it is determined that the ink entered in the field is not a gesture.

At step 710, the target is polled to determine appropriate action. The target has three possible responses. The target can request the ink, it can request the translated text, and it can request that the ink or text be appended to ink or text already in the target field.

If the system requests text, the system proceeds to step 711. At decision block 712, the argument "Append text?" is made. If the argument is false, the ink is translated in the background at step 713. At step 714, the translated text and ink are sent to the target. If the argument at decision block 712 is true, the present ink object is combined with the prior ink objects in the target field at step 715. The combined ink objects are sent to the target field at step 716 and the system then proceeds to step 713 and 714, where the combined ink object is translated in the background and the translated text and the ink object are sent to the target field.

When the target field requests ink, the system proceeds to step 717. At decision block 718, the argument "Append ink?" is made. If the argument is false, the system proceeds to step 719 and a new ink object is sent to the target. If the argument at decision block 718 is true, the system proceeds to step 720 and the ink is combined with the existing ink object into a new ink object. At step 721, the combined ink object is sent to the target field.

Label Object

The present invention permits a user to choose between displaying ink or displaying translated text at any time. This contrasts with prior art schemes where the original ink is discarded after it has been translated. The present invention is implemented in an object oriented programming environment in the preferred embodiment. An object, referred to here as a "label object", is defined. The label object is an object that can display text or ink. The label object is associated with a field object, retains the ink and translated text, and displays one or the other when requested by the associated target field object.

Figure 8:
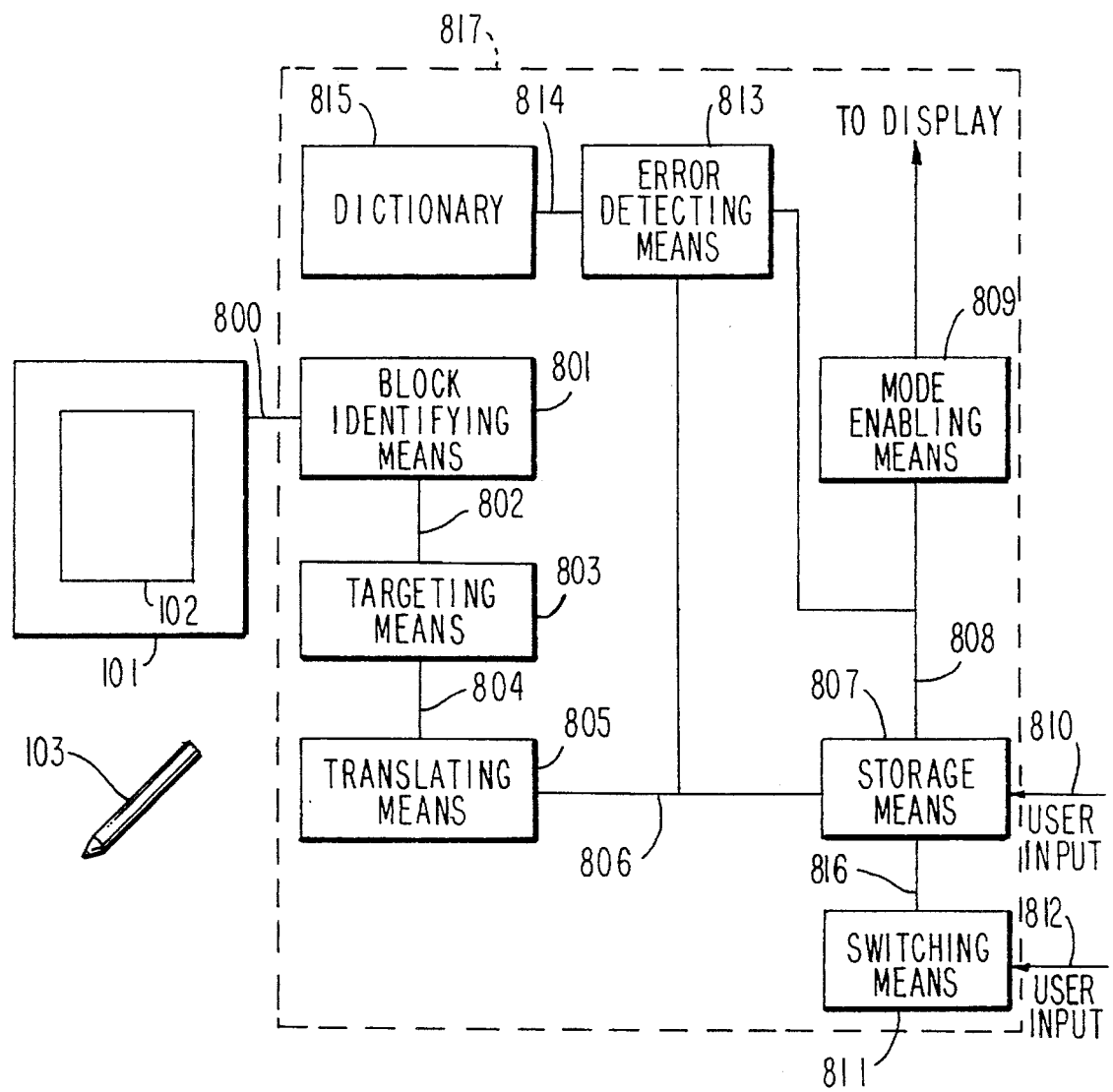
FIG. 8 is a block diagram of the present invention.

A block diagram of the present invention is illustrated in FIG. 8. A writing instrument 103 is used to write data on the display 102 of computer 101. Information about the strokes of data are provided to identifying means 801 on line 800.

The identifying means 801 is used to determine blocks of data. When a block of data is identified, it is provided on line 802 to targeting means 803. Targeting means 803 is used to determine the target field of the block of data.

After targeting, the block of data is provided on line 804 to translating means 805 and storage means 807. The translating means is used to translate the block of data and provides translated text on line 806 to storage means 807. The storage means 807 is used to store both the original block of ink and the translated text associated with a target field.

A mode enabling means 809 is coupled to the storage means through line 808. The mode enabling means is used to indicate whether one of the modes of deferred translation are to be enabled. The mode enabling means selects one of the original ink or translated text stored in the storage means to output to display 102 based on user input on line 810.

An error detecting means 813 is coupled to the translating means through line 806. The error detection means is optionally coupled to a dictionary 815 through line 814. The error detecting means 813 is used to determine the presence of untranslated characters in the translated block of text. If there are no untranslated characters, the error detecting means may compare the translated block of text to acceptable translations stored in the dictionary 815. The dictionary contains a list of words that are to be expected in the field of use of the computer system. For example, the dictionary 815 may be an English language dictionary. If desired, the dictionary may append words or blocks of characters that have been accepted by a user as part of its database. The error detection means 813 is coupled to the mode enabling means 809 on line 808.

A switching means 811 is coupled to the storage means 807 via line 816. The switching means, in response to user input on line 812, selectably enables the display of the translated block of data or the original ink. Because both images are stored in the storage means 807, a user can select between the two images at any time.

In the preferred embodiment of the present invention, the blocks within dashed line 817 of FIG. 8 are implemented as a series of instructions on a microprocessor based computer system. The storage means 807 may be integrated circuit memory such as RAM or DRAM, or it may be a moving media storage system such as a magnetic disk drive, magneto-optical drive or optical drive.

The present invention may be practiced in a processor based computer system by executing the instructions of Appendix 1 and Appendix 2.

Appendix 1 is an example of code suitable for implementing the deferred translation scheme of the present invention. Appendix 2 is an example of code for implementing a label object that can display either of text or ink.

Thus, a method and apparatus for providing deferred translation of entry data is described.

APPENDIX 1

```
/*-----------------------------------------------------------------
** DvDesireText returns whether or not the dataview wants some text.
**-----------------------------------------------------------------*/

MsgHandlerWithTypes(DvDesireText, P_DV_DESIRE, P_DVI)
    {
    P_DV_INST       pInst;
    DVLABEL_METRICS labelMetrics;

pInst = pData->pInst;
    pArgs->originalInk = objNull;           // assume no append
    pArgs->appendStatus = FALSE;            // assume no append
    if (pInst->hwxStyle.deferred)
        {
        OCall(msgDvLabelGetMetrics, self, &labelMetrics);
        if (labelMetrics.ink != objNull)
            {
            pArgs->originalInk = labelMetrics.ink;
            /* check for append */
            if (DvAppendInkOk(pArgs->ink, labelMetrics.ink) == TRUE)
                {
                pArgs->appendStatus = TRUE;
                }
            }
        pArgs->desireStatus = DV_DESIRE_TEXT;
        }
    else        // just regular text
        {
        pArgs->desireStatus = DV_DESIRE_TEXT;
        }
    return(stsOK);

MsgHandlerParametersNoWarning;
    }                       // end of DvDesireText /*-----------------------------------------------------------------
** DvSet sets the data for a dataview.
**-----------------------------------------------------------------*/ define MIN_APPEND_SPACE    0x120000    // 0.25" (18/72nds) in INTL units
define MAX_APPEND_OVERLAP  0x120000    // 0.25" (18/72nds) in INTL units MsgHandlerWithTypes(DvSet, P_DV_DATA_SET, P_DVI)
    {
    STATUS          s;
    P_DV_INST       pInst;
    DVLABEL_METRICS labelMetrics;
    char            newStr[DV_STR_MAXLENGTH];
    STR_METRICS     strMetrics;
    RECT32          inkRect;
    BOOLEAN         appendStatus, appendSpace;

pInst = pData->pInst;
    if (pArgs->fromUser)
        {

OCall(msgFvSetFocus, pInst->manager, self);

if (pInst->hwxStyle.deferred)
            {
            pArgs->inkVisible = TRUE;
            }
        else if (pInst->state.segmented)
            {
            strcpy(newStr, pArgs->pString);              // get local copy
            OCall(msgDvLabelMergeString, self, newStr);  // get the merged string
            pArgs->pString = newStr;
            ObjectPostU32(msgDestroy, pArgs->ink, argNull);
            pArgs->ink = objNull;
            }
        else    // regular text
            {

/* CHECK FOR APPEND
            **
            ** The rules are:
```

```
            ** If no overlap, append.
            ** if overlap < MAX_APPPEND_OVERLAP, append.
            ** if appending and distance > MIN_APPEND_SPACE, append a space.
            */
            appendStatus = FALSE;      // init
            appendSpace = FALSE;       // init
            OCall(msgInkGetBoundsINTL, pArgs->ink, &inkRect);

/* don't append if the string is empty */
            OCall(msgDvLabelGetMetrics, self, &labelMetrics);
            if (labelMetrics.boundRect.size.w != 0)
                {
                if (Rect32sIntersect(&labelMetrics.boundRect, &inkRect))
                    {
                    if ((inkRect.origin.x > labelMetrics.boundRect.origin.x) && \
                        (RightEdge(labelMetrics.boundRect) - inkRect.origin.x < MAX_APPEND_OVERLAP))
                        {
                        appendStatus = TRUE;
                        }
                    }
                else     // no overlap
                    {
                    appendStatus = TRUE;

/* figure out whether or not to put a space in here based on the
                    ** distance from the text
                    */
                    if (inkRect.origin.x - RightEdge(labelMetrics.boundRect) > MIN_APPEND_SPACE)
                        {
                        appendSpace = TRUE;
                        }
                    }
                }
            if (appendStatus)
                {
                /* append here */
                strMetrics.pString = newStr;
                strMetrics.len = DV_STR_MAXLENGTH;
                OCall(msgDvLabelGetString, self, &strMetrics);

if (appendSpace)
                    {
                    strcat(newStr, " ");        // insert a space
                    }
                strcat(newStr, pArgs->pString);
                pArgs->pString = newStr;
                ObjectPostU32(msgDestroy, pArgs->ink, pNull);
                pArgs->ink = objNull;
                }
            else     // replace because it's overwrite
                {
                if ((pInst->hwxStyle.xlateErrAction == dvXlateErrDefer) && \
                    (strchr(pArgs->pString, MEATBALL_CHAR) != pNull))
                    {
                    pArgs->inkVisible = TRUE;
                    }
                else
                    {
                    pArgs->inkVisible = FALSE;
                    }
                }
            }
    }
s = OCallAncCtx(ctx);
OCall(msgWinUpdate, pInst->manager, argNull);      // force repaint
if ((pArgs->pString != pNull) &&
    (pArgs->pString[0] != 0) &&
    (pArgs->status == dvValidateOk) &&
    (pInst->hwxStyle.historyType != dvHistoryOff))
    {
    OCall(msgStrListUse, pInst->historyList, pArgs->pString);   // remember this string
    }
return(s);

NoWarnings_METHOD;
}                  // end of DvSet
```

APPENDIX 2

```
/*-------------------------------------------------------------------
 File: dvlabel.c (C) Copyright 1991 by Slate Corporation, All Rights Reserved.

**-----------------------------------------------------------------*/

/* go include files */
#include <debug.h>
#include <go.h>
#include <clsmgr.h>
#include <win.h>
#include <string.h>
#include <sysfont.h>
#include <sysgraf.h>
#include <osheap.h>

/* slate include files */
#include <padefine.h>
#include <miscutil.h>
#include <comb.h>
#include <dvlabel.h>
#include <dvlabel.loc>
#include <formview.h>
#include <sdc.h>
#include <utils.h>
#include <item.h>
#include <ink.h>
#include <pafile.h>
#include <dvutils.h>
#include <paundo.h>

STATIC char emptyStr[] = "";

/*-------------------------------------------------------------------
** PROTOTYPES
**-----------------------------------------------------------------*/

STATUS LOCAL StringMeasure(P_INST pData, P_RECT32 pRect, U16 length);
STATUS LOCAL CombMeasureCharWidth(P_STRING pCombStr, SYSDC dc, P_U32 pWidth);
STATUS LOCAL DirtyCursor(U16 cursorPos, P_INST pData);

/*-------------------------------------------------------------------
** DvLabelNewDefaults
**-----------------------------------------------------------------*/

MsgHandlerWithTypes(DvLabelNewDefaults, P_DVLABEL_NEW, P_INST)
    {
    STATUS s;

OCallAncCtxRet(ctx);
    MemClear(&pArgs->dvLabel, sizeof(DVLABEL_NEW_ONLY));         // init to null /* set default values */
    GetDefaultScreenFont(&pArgs->dvLabel.style.fontInfo);
    pArgs->dvLabel.style.color.all = sysDcRGBBlack;
    return(stsOK);

NoWarnings_METHOD;
    }

/*-------------------------------------------------------------------
** DvLabelInit
**-----------------------------------------------------------------*/

MsgHandlerWithTypes(DvLabelInit, P_DVLABEL_NEW, P_INST)
    {
    INST       inst;
    P_STRING   pStr;

OCallAncCtx(ctx);

MemClear(&inst, sizeof(inst));

/* things from clsDvInput */
    inst.item = pArgs->dvInput.item;
    inst.manager = pArgs->dvInput.window;         // xfer manager /* things from my own newArgs */
    inst.style = pArgs->dvLabel.style;            // xfer style
    inst.clipRect = pArgs->dvLabel.clipRect;      // xfer clipRect
```

```
    if (Rect32Empty(&pArgs->dvLabel.clipRect))
        pArgs->dvLabel.clipRect = pArgs->dvInput.inputBounds;

if ((pArgs->dvLabel.location.x == 0) && (pArgs->dvLabel.location.y == 0))
    {
        /* if location wasn't passed in, set it from the clipRect */
        inst.location.x = inst.clipRect.origin.x + BrMakeFixed(5,0);
        inst.location.y = inst.clipRect.origin.y + inst.clipRect.size.h - BrMakeFixed(5,0);
    }
    else
    {
        inst.location = pArgs->dvLabel.location;
    }

/* now get the initial string */
    pStr = pArgs->dvLabel.pStr;
    if (pStr == pNull)                              // don't allow pNull
    {
        pStr = emptyStr;
    }
    inst.length = strlen(pStr);
    MemAllocLocal(inst.length+1, &inst.pStr);
    strcpy(inst.pStr,pStr);

if (!inst.style.segmented)
    {
        StringMeasure(&inst, &inst.boundRect, 0);   // measure the RECT of the string
    }
    else
    {
        inst.boundRect = inst.clipRect;
    }
    OWrite(self, ctx, &inst);                       // save instance data
    return(stsOK);

NoWarnings_METHOD;
    }
/*--------------------------------------------------------------------
** DvLabelFree
**------------------------------------------------------------------*/
MsgHandlerWithTypes(DvLabelFree, P_ARGS, P_INST)
{
    MemFree(pData->pStr);            /* free string */
    OCallAncCtx(ctx);
    return(stsOK);

NoWarnings_METHOD;
}
/*--------------------------------------------------------------------
** DvLabelClearCell
**------------------------------------------------------------------*/
MsgHandlerWithTypes(DvLabelClearCell, P_U16, P_INST)
{
    CELL_BOUNDS_INFO   cellBounds;
    OBJECT             dc;
    ITEM_METRICS       im;
    SDC_STATE          dcState;
    STATUS             s;

// return if not segmented
    if (!pData->style.segmented) return(stsOK);

// get the screen cell coords and clear
    OCallRet(msgItemGetMetrics, pData->item, &im);
    OCallRet(msgFWinGetSDC, pData->manager, &dc);    // get the DC
    OCall(msgSdcPush, dc, &dcState);
    OCallRet(msgWinBeginPaint, dc, Nil(P_ARGS));
    OCallJmp(msgDcUnitsDevice, dc, Nil(P_ARGS), POP);
    OCall(msgDcSetLineThickness, dc, (P_ARGS)0L);
    OCall(msgDcSetBackgroundRGB, dc, (P_ARGS)im.fillPat);
    OCall(msgDcSetForegroundRGB, dc, (P_ARGS)im.fillPat);
    cellBounds.cellNum = *pArgs;
    OCallJmp(msgCombGetCellScrnBounds, pData->item, &cellBounds, POP);
    OCall(msgDcDrawRectangle, dc, &cellBounds.cellBounds);
POP:
    OCall(msgWinEndPaint, dc, Nil(P_ARGS));
    OCall(msgSdcPop, dc, &dcState);
    return(s);

NoWarnings_METHOD;
    }                   // end of DvLabelClearCell
/*--------------------------------------------------------------------
** DvLabelRepaint
```

```
/*---------------------------------------------------------------------*/
MsgHandlerWithTypes(DvLabelRepaint, P_BR_DRAW_INFO, P_INST)
    {
    STATUS              s;
    BR_TEXT             bt;
    OBJECT              dc;
    U16                 i;
    char                pCombStr[2];
    CELL_BOUNDS_INFO    cellBounds;
    U32                 charWidth;
    char                tempStr[2];
    XY32                textStart;
    RECT32              stringBounds;
    SYSDC_POLYLINE      polyline;
    XY32                points[2];

if (pData->style.inkVisible)
        {
        return(stsOK);
        }
    else
        {
        /* special case on empty string with no cursor */
        if ((pData->length == 0) && (!pData->style.popUpIndicator) && (!pData->style.cursorVisible))
            return(stsOK);

OCallRet(msgFWinGetSDC, pData->manager, &dc);           // get the DC

/* set up clipping rectangle */
        if ((pData->clipRect.size.w != 0) && (pData->clipRect.size.h != 0))
            {
//          OCallNo(msgDcClipRect, dc, &pData->clipRect);
            if (pData->style.highlight == TRUE)
                {
                /* fill with black */
                OCallNo(msgDcSetLineThickness, dc, (P_ARGS)MakeU32(0,1));
                OCallNo(msgDcSetForegroundRGB, dc, (P_ARGS)sysDcRGBBlack);
                OCallNo(msgDcSetBackgroundRGB, dc, (P_ARGS)sysDcRGBBlack);
                OCallNo(msgDcSetFillPat, dc, (P_ARGS)sysDcPatBackground);
                OCallNo(msgDcSetLinePat, dc, (P_ARGS)sysDcPatForeground);
                OCallNo(msgDcDrawRectangle, dc, &pData->clipRect);
                }
            } ifdef jlf
ifdef DEBUG
        OCallNo(msgDcSetLineThickness, dc, (P_ARGS)MakeU32(0,1));
        OCallNo(msgDcSetForegroundRGB, dc, (P_ARGS)sysDcRGBGray33);
        OCallNo(msgDcSetBackgroundRGB, dc, (P_ARGS)sysDcRGBGray33);
        OCallNo(msgDcSetFillPat, dc, (P_ARGS)sysDcPatBackground);
        OCallNo(msgDcSetLinePat, dc, (P_ARGS)sysDcPatForeground);
        OCallNo(msgDcDrawRectangle, dc, &pData->boundRect);
#endif
endif /* set up the DC */
        if (pData->style.highlight == TRUE)
            {
            OCallNo(msgDcSetForegroundRGB, dc, (P_ARGS)sysDcRGBWhite);
            }
        else
            {
            OCallNo(msgDcSetForegroundRGB, dc, (P_ARGS)pData->style.color.all);
//          OCallNo(msgDcSetBackgroundRGB, dc, (P_ARGS)sysDcRGBWhite);
            }

OCall(msgSdcSetFont, dc, &pData->style.fontInfo);

if (!pData->style.segmented)
            {
            textStart = pData->location;
            if (pData->style.popUpIndicator)
                {
                /* draw the pop-up indicator */
                tempStr[0] = GO_POPUP_CHAR;
                tempStr[1] = ' ';
                tempStr[2] = 0;
                bt.align = sysDcAlignChrBaseline;       // baseline
                bt.pText = tempStr;                     // string
                bt.lenText = 1;                         // length
                bt.cp = textStart;                      // origin
                OCall(msgSdcDrawBrText, dc, &bt);       // draw the pop-up indicator
                CombMeasureCharWidth(tempStr, dc, &charWidth);
                textStart.x += charWidth;
                }
            bt.align = sysDcAlignChrBaseline;           // baseline
            bt.pText = pData->pStr;                     // string
```

```
                bt.lenText = pData->length;              // length
                bt.cp = textStart;                       // origin
                if (pData->style.alignment == DVLABEL_RIGHT_ALIGN)
                {
                    bt.cp.x += (pData->clipRect.size.w - pData->boundRect.size.w - (2 * BrMakeFixed(5,0)));
                }
                else if (pData->style.alignment == DVLABEL_CENTER_ALIGN)
                {
                    bt.cp.x += ((pData->clipRect.size.w - pData->boundRect.size.w - (2 * BrMakeFixed(5,0))) / 2);
                }
                OCall(msgSdcDrawBrText, dc, &bt);

/* now draw the cursor */
                if ((pData->style.cursorVisible) && (pData->cursorPos <= pData->length))
                {
                    StringMeasure(pData, &stringBounds, pData->cursorPos);
                    if (pData->cursorPos == 0)
                    {
                        stringBounds.size.w = 0;
                    }
                    OCallNo(msgDcSetLineThickness, dc, (P_ARGS)MakeU32(0,1));
                    polyline.points = points;
                    polyline.count = 2;
                    points[0].x = points[1].x = pData->boundRect.origin.x + stringBounds.size.w;
                    points[0].y = pData->boundRect.origin.y;
                    points[1].y = pData->boundRect.origin.y + pData->boundRect.size.h;
                    OCall(msgDcDrawPolyline, dc, &polyline);
                }
            }
            else        // segmented
            {
                bt.align = sysDcAlignChrBaseline;         // baseline
                bt.pText = pCombStr;                      // string
                bt.lenText = 1;                           // length
                pCombStr[1] = '\0';
                // loop through each character string and paint each character
                for (i = 0; pData->pStr[i]; i++)
                {
                    cellBounds.cellNum = i;
                    s = OCallNo(msgCombGetCellIntlBounds, pData->item, &cellBounds);
                    if (s < stsOK)
                    {
                        StsWarn(s);
                        continue;
                    }
                    pCombStr[0] = pData->pStr[i];
                    Warn(CombMeasureCharWidth(pCombStr, dc, &charWidth));
                    bt.cp.x = cellBounds.cellBounds.origin.x + (cellBounds.cellBounds.size.w / 2) - (charWidth/2);
                    bt.cp.y = pData->location.y;
                    OCall(msgSdcDrawBrText, dc, &bt);
                }
            }
            OCallNo(msgDcClipClear, dc, pNull);          // restore clipping region
        }
        return(stsOK);

NoWarnings_METHOD;
    }                   // end of DvLabelRepaint
/*----------------------------------------------------------------------
** DvLabelSetString sets a new string for the label.
**--------------------------------------------------------------------*/
MsgHandlerWithTypes(DvLabelSetString, P_STRING, P_INST)
{
    STATUS      s;
    INST        inst;
    U16         newLength;
    RECT32      oldRect;
    RECT32      clippedRect;
    SYSDC       dc;
    U16         numCells, i, last;
    CELL_BOUNDS_INFO    cellBounds;
    P_STRING    pStr;

inst = *pData;                    // get instance data
    pStr = pArgs;
    if (pStr == pNull)
        pStr = emptyStr;              // don't allow pNull /* this is optimized if the new string is the same length */
    newLength = strlen(pStr);

/* optimized if the same string */
    if ((newLength == inst.length) && (strcmp(pStr, inst.pStr) == 0))
    {
        return(stsOK);
```

```
        )
    if (inst.style.segmented)          // compute dirty cells
        {
        // dirty before copy so can compare which are different
        OCall(msgCombGetNumCells, inst.item, &numCells);
        last = Min(numCells, Min(newLength, inst.length));
        for (i = 0; i < last; i++)
            {
            if (pStr[i] != inst.pStr[i])
                {
                cellBounds.cellNum = i;
                OCall(msgCombGetCellScrnBounds, inst.item, &cellBounds);
                OCall(msgWinDirtyRect, inst.manager, &cellBounds.cellBounds);
                }
            }
        // now dirty left over cells
        last = Min(numCells, Max(newLength, inst.length));
        for (; i < last; i++)
            {
            cellBounds.cellNum = i;
            OCall(msgCombGetCellScrnBounds, inst.item, &cellBounds);
            OCall(msgWinDirtyRect, pData->manager, &cellBounds.cellBounds);
            }
        } if (newLength != inst.length)      // if different size, resize heap
        {
        WarnRet(OSHeapBlockResize(newLength+1, &inst.pStr));
        inst.length = newLength;       // update length
        }
    strcpy(inst.pStr, pStr);           // copy in the new string
    oldRect = inst.boundRect;          // remember old rect
    if (!inst.style.segmented)
        {
        StringMeasure(&inst, &inst.boundRect, 0);  // measure the RECT of the string
        }
    if (!inst.style.inkVisible)  // if now showing ink
        {
        OCallRet(msgFWinGetSDC, inst.manager, &dc);
        OCallNo(msgDcSetLineThickness, dc, (P_ARGS)MakeU32(0,1));

if (!inst.style.segmented)
            {
            if ((pData->clipRect.size.w != 0) && (pData->clipRect.size.h != 0))
                {
                if (inst.style.popUpIndicator == TRUE)
                    {
                    // FIXME: don't have to dirty the popup indicator here
                    OCall(msgSdcDirtyRect, dc, &pData->clipRect);  // dirty the whole area here
                    }
                else
                    {
                    Rect32Intersect(&pData->clipRect, &oldRect, &clippedRect);
                    OCall(msgSdcDirtyRect, dc, &clippedRect);      // dirty old rect
                    Rect32Intersect(&pData->clipRect, &inst.boundRect, &clippedRect);
                    OCall(msgSdcDirtyRect, dc, &clippedRect);      // dirty new rect
                    }
                }
            else
                {
                OCall(msgSdcDirtyRect, dc, &oldRect);              // dirty old rect
                OCall(msgSdcDirtyRect, dc, &inst.boundRect);       // dirty new rect
                }
            }
        }
    OWriteRet(self, ctx, &inst);       // save instance data
    return(stsOK);

NoWarnings_METHOD;
    }              // DvLabelSetString

/*-------------------------------------------------------------------------
** DvLabelMergeString sets a new string for the label.
**------------------------------------------------------------------------*/

MsgHandlerWithTypes(DvLabelMergeString, P_STRING, P_INST)
    {
    CELL_BOUNDS_INFO   cellBounds;
    U16        numCells;
    U16        i;

if (pArgs == pNull)
        return(stsOK);                 // don't allow pNull

OCall(msgCombGetNumCells, pData->item, &numCells);
    // loop through first to last dirty character and dirty
    for (i = 0; pArgs[i] && pData->pStr[i]; i++)
```

```c
        {
        if (pArgs[i] != ' ')
            {
            pData->pStr[i] = pArgs[i];
            if (i < numCells)
                {
                cellBounds.cellNum = i;
                OCall(msgCombGetCellScrnBounds, pData->item, &cellBounds);
                OCall(msgWinDirtyRect, pData->manager, &cellBounds.cellBounds);
                }
            }
        else
            {
            pArgs[i] = pData->pStr[i];
            }
        }
    return(stsOK);

NoWarnings_METHOD;
    }                   // DvLabelMergeString

/*---------------------------------------------------------------------
** DvLabelDeleteChars sets a new string for the label.
**------------------------------------------------------------------*/

MsgHandlerWithTypes(DvLabelDeleteChars, P_DVLABEL_PIECE, P_INST)
    {
    STATUS      s;
    INST        inst;
    U16         first, last, len;
    U16         numCells, i;
    CELL_BOUNDS_INFO    cellBounds;

inst = *pData;                      // get instance data len = strlen(inst.pStr);
    first = Min(pArgs->beg, len);
    last = pArgs->beg + pArgs->count;
    last = Min(last, len);
    memmove(&inst.pStr[first], &inst.pStr[last], (size_t)(len - last + 1));
    inst.length = strlen(inst.pStr);
    if (inst.style.segmented && inst.manager)       // compute dirty cells
        {
        // dirty before copy so can compare which are different
        OCall(msgCombGetNumCells, inst.item, &numCells);
        for (i = first; i < numCells; i++)
            {
            cellBounds.cellNum = i;
            OCall(msgCombXCellScrnBounds, inst.item, &cellBounds);
            OCall(msgWinDirtyRect, pData->manager, &cellBounds.cellBounds);
            }
        }
    OWriteRet(self, ctx, &inst);        // save instance data
    return(stsOK);

NoWarnings_METHOD;
    }                   // DvLabelDeleteChars

/*---------------------------------------------------------------------
** DvLabelInsertSpaces
**------------------------------------------------------------------*/

MsgHandlerWithTypes(DvLabelInsertSpaces, P_DVLABEL_PIECE, P_INST)
    {
    STATUS      s;
    INST        inst;
    U16         first, last, len;
    U16         numCells, i;
    CELL_BOUNDS_INFO    cellBounds;

inst = *pData;                      // get instance data len = strlen(inst.pStr);
    first = Min(pArgs->beg, len);
    last = pArgs->beg + pArgs->count;
    inst.length = len + last - first;
    WarnRet(OSHeapBlockResize(inst.length + 1, &inst.pStr));
    memmove(&inst.pStr[last], &inst.pStr[first], (size_t)(len - first + 1));
    for (i = first; i < last; i++) inst.pStr[i] = ' ';

if (inst.style.segmented && inst.manager)       // compute dirty cells
        {
        // dirty before copy so can compare which are different
        OCall(msgCombGetNumCells, inst.item, &numCells);
        last = Min(numCells, inst.length);
        for (i = first; i < last; i++)
            {
```

```
                cellBounds.cellNum = i;
                OCall(msgCombGetCellScrnBounds, inst.item, &cellBounds);
                OCall(msgWinDirtyRect, pData->manager, &cellBounds.cellBounds);
            }
        }
    OWriteRet(self, ctx, &inst);         // save instance data
    return(stsOK);

NoWarnings_METHOD;
    }                   // DvLabelInsertSpaces
/*-------------------------------------------------------------------------
** DvLabelGetString returns the current string.
**-----------------------------------------------------------------------*/

MsgHandlerWithTypes(DvLabelGetString, P_STR_METRICS, P_INST)
    {
    U16         copyLength;

#ifdef DEBUG
    if (pArgs->pString == pNull)
        {
        Debugf("Null pointer passed to DvLabelGetString");
        return(stsOK);
        }
#endif
    if (pData->length == 0)
        {
        pArgs->len = 0;            // null length
        pArgs->pString[0] = 0;     // return null str
        return(stsOK);
        }
    if (pData->length > pArgs->len - 1)        // if buffer is too short
        {
        copyLength = pArgs->len - 1;           // only copy buffer length
        }
    else
        {
        copyLength = pData->length;            // copy full length
        }
    strncpy(pArgs->pString, pData->pStr, copyLength);
    pArgs->len = copyLength;                   // return the length too
    pArgs->pString[copyLength] = 0;            // always terminate
    return(stsOK);

NoWarnings_METHOD;
    }                   // DvLabelGetString

/*-------------------------------------------------------------------------
** DvLabelDirty dirties the area of the label.
**-----------------------------------------------------------------------*/

MsgHandlerWithTypes(DvLabelDirty, P_ARGS, P_INST)
    {
    SYSDC    dc;

if (pData->style.inkVisible)
        {
        if (pData->ink != objNull)
            {
            INK_DRAW_BASELINE       inkDrawBaseline;

inkDrawBaseline.window = pData->manager;
            inkDrawBaseline.rect = pData->clipRect;
            inkDrawBaseline.margin = 0;
            inkDrawBaseline.baseline = pData->clipRect.origin.y;
            OCall(msgFWinGetSDC, pData->manager, &inkDrawBaseline.dc);
            OCall(msgInkMakeDirtyWithBaseline, pData->ink, &inkDrawBaseline);
            }
        }
    else            // no ink, do the text
        {
        OCall(msgFWinGetSDC, pData->manager, &dc);
        OCallNo(msgDcSetLineThickness, dc, (P_ARGS)MakeU32(0,1));
        OCall(msgSdcDirtyRect, dc, &pData->boundRect);     // dirty new rect
        }
    return(stsOK);

NoWarnings_METHOD;
    }
/*-------------------------------------------------------------------------
** DvLabelSetMetrics
**-----------------------------------------------------------------------*/

MsgHandlerWithTypes(DvLabelSetMetrics, P_DVLABEL_METRICS, P_INST)
    {
    STATUS   s;
```

```
    INST    inst;

inst = *pData;
    inst.location = pArgs->location;
    inst.clipRect = pArgs->clipRect;
    inst.manager = pArgs->manager;
    OWriteRet(self, ctx, &inst);              // save instance data
    if (!inst.style.segmented)
        {
        StringMeasure(&inst, &inst.boundRect, 0);       // measure the RECT of the string
        }
    OWriteRet(self, ctx, &inst);              // save instance data
    return(stsOK);

NoWarnings_METHOD;
    }                       // end of DvLabelSetMetrics
/*----------------------------------------------------------------------
** DvLabelGetMetrics
**--------------------------------------------------------------------*/

MsgHandlerWithTypes(DvLabelGetMetrics, P_DVLABEL_METRICS, P_INST)
    {
    pArgs->location = pData->location;
    pArgs->clipRect = pData->clipRect;
    pArgs->boundRect = pData->boundRect;
    pArgs->manager = pData->manager;
    pArgs->ink = pData->ink;
    return(stsOK);

NoWarnings_METHOD;
    }                       // end of DvLabelGetMetrics
/*----------------------------------------------------------------------
** DvLabelHighlight sets the highlight status to true or false.
**--------------------------------------------------------------------*/

MsgHandlerWithTypes(DvLabelHighlight, BOOLEAN32, P_INST)
    {
    STATUS   s;
    INST     inst;
    SYSDC    dc;

if (pData->style.highlight == (U8)(BOOLEAN)pArgs)
        {
        return(stsOK);                          // no change
        }
    inst = *pData;
    inst.style.highlight = (BOOLEAN)pArgs;
    OWriteRet(self, ctx, &inst);              // save instance data OCallRet(msgFWinGetSDC, inst.manager, &dc);
    OCallNo(msgDcSetLineThickness, dc, (P_ARGS)MakeU32(0,1));
    OCall(msgSdcDirtyRect, dc, &pData->clipRect);   // dirty entire rect
    return(stsOK);

NoWarnings_METHOD;
    }                       // end of DvLabelHighlight
/*----------------------------------------------------------------------
** DvLabelGetStyle
**--------------------------------------------------------------------*/

MsgHandlerWithTypes(DvLabelGetStyle, P_DVLABEL_STYLE, P_INST)
    {
    *pArgs = pData->style;
    return(stsOK);

NoWarnings_METHOD;
    }                       // end of DvLabelGetStyle
/*----------------------------------------------------------------------
** DvLabelSetStyle
**--------------------------------------------------------------------*/

MsgHandlerWithTypes(DvLabelSetStyle, P_DVLABEL_STYLE, P_INST)
    {
    INST        inst;
    DV_HAS_INK  dvHasInk;

inst = *pData;
    if (inst.style.inkVisible != pArgs->inkVisible)  // if this is changing
        {
        dvHasInk.dv = self;
        dvHasInk.inkVisible = pArgs->inkVisible;
        OCall(msgFvDvHasInk, inst.manager, &dvHasInk);
        }
```

```
    inst.style = *pArgs;
    return(OWrite(self, ctx, &inst));        // save instance data NoWarnings_METHOD;
    }                        // end of DvLabelSetStyle
/*---------------------------------------------------------------------
** DvLabelGetPtr returns a read-only access
**-------------------------------------------------------------------*/

MsgHandlerWithTypes(DvLabelGetPtr, PP_STRING, P_INST)
    {
    *pArgs = pData->pStr;
    return(stsOK);

MsgHandlerParametersNoWarning;
    }                        // end of DvLabelGetPtr
/*---------------------------------------------------------------------
** DvLabelSetInk
**-------------------------------------------------------------------*/

MsgHandlerWithTypes(DvLabelSetInk, OBJECT, P_INST)
    {
    INST                inst;

inst = *pData;
    if ((inst.ink != objNull) && (inst.ink != pArgs))
        {
        if (inst.style.inkVisible)
            {
            OCall(msgDvLabelDirty, self, argNull);   // dirty old ink
            }
        OPostU32(msgDestroy, inst.ink, argNull);     // destroy old ink
        } inst.ink = pArgs;
    OWrite(self, ctx, &inst);                // save instance data
    if ((inst.style.inkVisible) && (inst.ink != objNull))
        {
        OCall(msgDvLabelDirty, self, argNull);    // dirty new ink
        }
    return(stsOK);

MsgHandlerParametersNoWarning;
    }                        // end of DvLabelSetInk
/*---------------------------------------------------------------------
** DvLabelDrawInk
**-------------------------------------------------------------------*/

MsgHandlerWithTypes(DvLabelDrawInk, P_ARGS, P_INST)
    {
    STATUS          s;
    BR_DRAW_INFO    bdi;

OCallRet(msgFWinGetSDC, pData->manager, &bdi.dc);
    bdi.dirtyRect.size.h = maxS32;
    bdi.dirtyRect.size.w = maxS32;
    bdi.dirtyRect.origin.x = 0;
    bdi.dirtyRect.origin.y = 0;
    OCallRet(msgWinBeginPaint, pData->manager, pNull);
    OCall(msgDvLabelRepaintInk, self, &bdi);
    OCall(msgWinEndPaint, pData->manager, pNull);
    return(stsOK);

MsgHandlerParametersNoWarning;
    }                        // end of DvLabelDrawInk
/*---------------------------------------------------------------------
** DvLabelRepaintInk
**-------------------------------------------------------------------*/

MsgHandlerWithTypes(DvLabelRepaintInk, P_BR_DRAW_INFO, P_INST)
    {
    STATUS           s;

if (pData->style.inkVisible)
        {
        if (pData->ink != objNull)
            {
            /* draw with scaling here */
            INK_DRAW_BASELINE       inkDrawBaseline;

inkDrawBaseline.window = pData->manager;
            inkDrawBaseline.rect = pData->clipRect;
            inkDrawBaseline.margin = 0;
            inkDrawBaseline.baseline = pData->clipRect.origin.y;
```

```
            OCall(msgFWinGetSDC, pData->manager, &inkDrawBaseline.dc);
            OCallRet(msgInkDrawWithBaseline, pData->ink, &inkDrawBaseline);
#ifdef jlf
            /* draw without scaling here */
            INK_DRAW_INFO       inkDrawInfo;

inkDrawInfo.dc = pArgs->dc;
            inkDrawInfo.dirtyRect = pArgs->dirtyRect;
            OCallRet(msgInkDraw, pData->ink, &inkDrawInfo);
endif }
        )
    return(stsOK);

MsgHandlerParametersNoWarning;
    }                       // end of DvLabelRepaintInk
/*-----------------------------------------------------------------
** DvLabelInkVisible
**----------------------------------------------------------------*/

MsgHandlerWithTypes(DvLabelInkVisible, BOOLEAN32, P_INST)
    {
    INST        inst;
    DV_HAS_INK  dvHasInk;

inst = *pData;
    /* if state is changing */
    if (inst.style.inkVisible != (BOOLEAN16)pArgs)
        {
        OCall(msgDvLabelDirty, self, pNull);     // dirty old label or ink
        dvHasInk.dv = self;
        dvHasInk.inkVisible = (BOOLEAN16)pArgs;
        OCall(msgPvDvHasInk, inst.manager, &dvHasInk);
        inst.style.inkVisible = (BOOLEAN16)pArgs;
        OWrite(self, ctx, &inst);                // save instance data
        OCall(msgDvLabelDirty, self, pNull);     // dirty new label or ink
        }
    return(stsOK);

MsgHandlerParametersNoWarning;
    }                       // end of DvLabelInkVisible
/*-----------------------------------------------------------------
** DvLabelConcatString
**----------------------------------------------------------------*/

MsgHandlerWithTypes(DvLabelConcatString, P_STRING, P_INST)
    {
    char        newString[2048];

if (pArgs == pNull)
        {
        return(stsOK);
        }
    strcpy(newString, pData->pStr);
    strcat(newString, pArgs);
    return(OCall(msgDvLabelSetString, self, &newString));

MsgHandlerParametersNoWarning;
    }                       // end of DvLabelConcatString
/*-----------------------------------------------------------------
** DvLabelSetCursor
**----------------------------------------------------------------*/

MsgHandlerWithTypes(DvLabelSetCursor, U32, P_INST)
    {
    STATUS      s;
    INST        inst;
    U16         origCursorPos;

inst = *pData;
    origCursorPos = inst.cursorPos;      // save original position
    inst.cursorPos = (U16)pArgs;
    OWriteRet(self, ctx, &inst);         // save instance data
    if ((pData->style.cursorVisible) && (origCursorPos != inst.cursorPos))
        {
        DirtyCursor(origCursorPos, pData);    // dirty old location
        DirtyCursor(inst.cursorPos, pData);   // dirty new location
        }
    return(stsOK);

MsgHandlerParametersNoWarning;
```

```
       )                      // end of DvLabelSetCursor
/*---------------------------------------------------------------------
** DvLabelCursorVisible
**-------------------------------------------------------------------*/

MsgHandlerWithTypes(DvLabelCursorVisible, BOOLEAN32, P_INST)
    {
    STATUS     s;
    INST       inst;

inst = *pData;
    if (inst.style.cursorVisible == (BOOLEAN8)((BOOLEAN)pArgs))
        {
        return(stsOK);
        }
    inst.style.cursorVisible = (BOOLEAN)pArgs;
    OWriteRet(self, ctx, &inst);              // save instance data
    DirtyCursor(pData->cursorPos, pData);     // dirty the cursor position
    return(stsOK);

MsgHandlerParametersNoWarning;
    }                        // end of DvLabelCursorVisible
/*---------------------------------------------------------------------
** DvLabelGetCursor
**-------------------------------------------------------------------*/

MsgHandlerWithTypes(DvLabelGetCursor, P_U16, P_INST)
    {
    *pArgs = pData->cursorPos;
    return(stsOK);

MsgHandlerParametersNoWarning;
    }                        // end of DvLabelGetCursor
/*---------------------------------------------------------------------
** DvLabelGetFocus
**-------------------------------------------------------------------*/

MsgHandlerWithTypes(DvLabelGetFocus, P_ARGS, P_INST)
    {
    OCallAncCtx(ctx);
    return(OCall(msgDvLabelSetCursor, self, (P_ARGS)pData->length));

MsgHandlerParametersNoWarning;
    }                        // end of DvLabelGetFocus
/*---------------------------------------------------------------------
** DvLabelLoseFocus
**-------------------------------------------------------------------*/

MsgHandlerWithTypes(DvLabelLoseFocus, BOOLEAN32, P_INST)
    {
    OCallAncCtx(ctx);
    return(OCall(msgDvLabelCursorVisible, self, (P_ARGS)FALSE));

MsgHandlerParametersNoWarning;
    }                        // end of DvLabelLoseFocus
/*---------------------------------------------------------------------
** DvLabelGetMoveBounds overrides msgDvInputGetMoveBounds.
**-------------------------------------------------------------------*/

MsgHandlerWithTypes(DvLabelGetMoveBounds, P_RECT32, P_INST)
    {
    if (pData->style.inkVisible)
        {
        return(OCall(msgInkGetBoundsINTL, pData->ink, pArgs));
        }
    else if (pData->style.segmented)
        {
        return(OCallAncCtx(ctx));     // use regular bounds
        }
    else
        {
        *pArgs = pData->boundRect;
        }
    return(stsOK);

MsgHandlerParametersNoWarning;
    }                        // end of DvLabelGetMoveBounds
/*---------------------------------------------------------------------
** DvLabelCopyFromOk overrides msgDvInputCopyFromOk if the data is empty.
**-------------------------------------------------------------------*/

MsgHandlerWithTypes(DvLabelCopyFromOk, P_BOOLEAN, P_INST)
```

```
    {
    if (pData->style.inkVisible)
        {
        if (pData->ink == objNull)
            {
            *pArgs = FALSE;
            return(stsOK);
            }
        }
    else
        {
        if (pData->length == 0)
            {
            *pArgs = FALSE;
            return(stsOK);
            }
        }
    return(OCallAncCtx(ctx));

MsgHandlerParametersNoWarning;
    }                       // end of DvLabelCopyFromOk
/*---------------------------------------------------------------------
** DvLabelGetDescrSize
**-------------------------------------------------------------------*/

MsgHandlerWithTypes(DvLabelGetDescrSize, P_U32, P_INST)
    {
    OCallAncCtx(ctx);
    *pArgs += SizeOf(DV_LABEL_FEATURES);
    return(stsOK);

MsgHandlerParametersNoWarning;
    }                       // end of DvLabelGetDescrSize
/*---------------------------------------------------------------------
** DvLabelDescribeSelf
**-------------------------------------------------------------------*/

MsgHandlerWithTypes(DvLabelDescribeSelf, PP_U8, P_INST)
    {
    STATUS              s;
    DV_LABEL_FEATURES   feature;

OCallAncCtxRet(ctx);                    // describe ancestor first
    MemClear(&feature, sizeof(feature));
    feature.info.featureTag = DV_LABEL_TAG;
    feature.info.featureFlags = 0;
    feature.info.featureSize = sizeof(DV_LABEL_FEATURES);
    feature.info.featureVersion = 0;
    feature.color = pData->style.color;
    feature.fontInfo = pData->style.fontInfo;
    feature.alignment = pData->style.alignment;
    feature.comb = pData->style.segmented;
    MemWrite(&feature, pArgs, sizeof(DV_LABEL_FEATURES));
    return(stsOK);

MsgHandlerParametersNoWarning;
    }                       // end of DvLabelDescribeSelf /*---------------------------------------------------------------------
** DvLabelSetFeature
**-------------------------------------------------------------------*/

MsgHandlerWithTypes(DvLabelSetFeature, P_DV_FEATURE, P_INST)
    {
    P_DV_LABEL_FEATURES pFeatures;
    INST                inst;

OCallAncCtx(ctx);
    if (pArgs->featureTag == DV_LABEL_TAG)
        {
        inst = *pData;
        pFeatures = (P_DV_LABEL_FEATURES)pArgs;
        inst.style.color = pFeatures->color;
        inst.style.fontInfo = pFeatures->fontInfo;
        inst.style.alignment = pFeatures->alignment;
        inst.style.segmented = pFeatures->comb;
        OWrite(self, ctx, &inst);           // save instance data
        }
    else if (pArgs->featureTag == DV_FIELD_TAG)
        {
        inst = *pData;
        inst.style.popUpIndicator = ((P_DV_FIELD_FEATURES)pArgs)->choice;
        OWrite(self, ctx, &inst);           // save instance data
        }
    return(stsOK);
```

```
    MsgHandlerParametersNoWarning;
    }                       // end of DvLabelSetFeature
/*----------------------------------------------------------------
** DvLabelSetInputMetrics responds to msgDvInputSetMetrics.
**---------------------------------------------------------------*/

MsgHandlerWithTypes(DvLabelSetInputMetrics, P_DVINPUT_METRICS, P_INST)
    {
    INST          inst;

inst = *pData;
    inst.manager = pArgs->window;
    inst.item   = pArgs->item;
    OWrite(self, ctx, &inst);            // save instance data
    OCallAncCtx(ctx);
    return(stsOK);

MsgHandlerParametersNoWarning;
    }                       // end of DvLabelSetInputMetrics /*----------------------------------------------------------------
** DvLabelSetInputBounds responds to msgDvInputSetBounds.
**---------------------------------------------------------------*/

MsgHandlerWithTypes(DvLabelSetInputBounds, P_RECT32, P_INST)
    {
    STATUS       s;
    INST         inst;

inst = *pData;
    s = OCall(msgItemGetDataRect, inst.item, &inst.clipRect);
    if (s != stsOK)
        {
        inst.clipRect = *pArgs;
        }
    inst.location.x = inst.clipRect.origin.x + BrMakeFixed(5,0);
    inst.location.y = inst.clipRect.origin.y + inst.clipRect.size.h - BrMakeFixed(5,0);
    OWrite(self, ctx, &inst);            // save instance data
    OCallAncCtx(ctx);
    return(stsOK);

MsgHandlerParametersNoWarning;
    }                       // end of DvLabelSetInputBounds /*----------------------------------------------------------------
** DvLabelPaSave responds to msgPaSave.
**---------------------------------------------------------------*/

MsgHandlerWithTypes(DvLabelPaSave, P_PA_SAVE, P_INST)
    {
    STATUS       s;
    PA_DV_LABEL  record;

OCallAncCtxRet(ctx);
    MemClear(&record, sizeof(record));
    record.header.recordType    = paRecDvLabel;
    record.header.recordLength  = sizeof(PA_DV_LABEL) + pData->length + 1;
    record.style.alignment      = (U8)pData->style.alignment;
    record.style.comb           = (U8)pData->style.segmented;
    record.style.inkVisible     = (U8)pData->style.inkVisible;
    record.color.all            = pData->style.color.all;
    //FIXME: have to add support for fontIndex here
    record.fontIndex            = 0;
    WarnRet(WriteBytes(pArgs->file, &record, sizeof(record)));
    return(WriteBytes(pArgs->file, pData->pStr, pData->length + 1));

MsgHandlerParametersNoWarning;
    }                       // end of DvLabelPaSave /*----------------------------------------------------------------
** DvLabelPaRestoreRecord responds to msgPaRestoreRecord.
**---------------------------------------------------------------*/

MsgHandlerWithTypes(DvLabelPaRestoreRecord, P_PA_RESTORE_RECORD, P_INST)
    {
    STATUS         s;
    P_PA_DV_LABEL  pRecord;
    INST           inst;

OCallAncCtxRet(ctx);
    if (pArgs->recordType == paRecDvLabel)
        {
        inst = *pData;
        MemFreeCheck(inst.pStr);
        pRecord = (P_PA_DV_LABEL)(pArgs->pRecord);
        inst.style.alignment    = pRecord->style.alignment;
```

```
            inst.style.segmented    = pRecord->style.comb;
            inst.style.inkVisible   = pRecord->style.inkVisible;
            inst.style.color.all    = pRecord->color.all;
            //FIXME: have to add support for fontIndex here
            WarnRet(StrAllocLocal(&pRecord->string[0], &inst.pStr));
            inst.length = strlen(inst.pStr);
            StringMeasure(&inst, &inst.boundRect, 0);   // measure the RECT of the string
            OWrite(self, ctx, &inst);                    // save instance data
            )
    return(stsOK);

MsgHandlerParametersNoWarning;
    }                           // end of DvLabelPaRestoreRecord
/*-------------------------------------------------------------------
** DvLabelSet responds to msgDvDataSet.
**-----------------------------------------------------------------*/

MsgHandlerWithTypes(DvLabelSet, P_DV_DATA_SET, P_INST)
    {
    INST                inst;
    INK_HWX_METRICS     inkHwxMetrics;
    DV_HAS_INK          dvHasInk;
    UNDOMGR_RECORD      undoRecord;

inst = *pData;

/* take care of undo */ undoRecord.msg          = msgDvDataSetString;
    undoRecord.data         = pData->pStr;
    undoRecord.dataLength   = pData->length + 1;
    OCall(msgDvInputUndoRecordEvent, self, &undoRecord);

/* do the ink */ if (pArgs->ink != objNull)
        {
        /* set the translation metrics on the ink object */
        inkHwxMetrics.translationRect = inst.clipRect;
        OCall(msgFWinGetSDC, inst.manager, &inkHwxMetrics.dc);
        inkHwxMetrics.baselineOffset = 0;
        OCall(msgInkSetHwxMetrics, pArgs->ink, &inkHwxMetrics);
        }
    else
        {
        pArgs->inkVisible = FALSE;      // never visible if no ink
        } if ((inst.style.inkVisible != (BOOLEAN8)pArgs->inkVisible)   // if status changing
        {
        dvHasInk.dv = self;
        dvHasInk.inkVisible = (BOOLEAN16)pArgs->inkVisible;
        OCall(msgFvDvHasInk, inst.manager, &dvHasInk);
        } if ((inst.ink != objNull) && (inst.ink != pArgs->ink))
        {
        if (inst.style.inkVisible)
            {
            OCall(msgDvLabelDirty, self, argNull);   // dirty old ink if it was visible
            }
        OPostU32(msgDestroy, inst.ink, argNull);     // destroy old ink
        } inst.ink = pArgs->ink;                  // remember new ink
    inst.style.inkVisible = pArgs->inkVisible;
    OWrite(self, ctx, &inst);               // save instance data
    OCall(msgDvLabelSetString, self, pArgs->pString);

if (((inst.style.inkVisible) && (inst.ink != objNull) && (pArgs->drawInkIfVisible)))
        {
        OCall(msgDvLabelDrawInk, self, argNull);
        }
    return(OCallAncCtx(ctx));

MsgHandlerParametersNoWarning;
    }                           // end of DvLabelSet
/*-------------------------------------------------------------------
** clsDvLabelInit
**-----------------------------------------------------------------*/ extern P_METHOD_TABLE clsDvLabelTable;

STATUS GLOBAL clsDvLabelInit(void)
    {
    CLASS_NEW   new;
```

```
    STATUS          s;

OCallNo(msgNewDefaults, clsClass, &new);
    new.object.key = (OBJ_KEY)clsDvLabelTable;
    new.object.uid = clsDvLabel;
    new.class.pMsg = clsDvLabelTable;
    new.class.ancestor = clsDvData;
    new.class.size = SizeOf(INST);
    new.class.newArgsSize = SizeOf(DVLABEL_NEW);
    OCallRet(msgNew, clsClass, &new);
    return(stsOK);
    }

/***************************************************************/
/* LOCAL ROUTINES                                               */
/***************************************************************/

/*-------------------------------------------------------------
** StringMeasure calculates the bounding rect for a string.
**
** Passed: P_INST, place to put the returned bounding rect.
**
** Input: origin, fontSize, pStr, length in that struct.
**
** Output: ^pRect
**------------------------------------------------------------*/
STATUS LOCAL StringMeasure(P_INST pData, P_RECT32 pRect, U16 length)
    {
    SYSDC_TEXT_OUTPUT   tx;
    SYSDC               dc;
    SYSDC_FONT_METRICS  fm;
    COORD32             descenderHt;

if ((pData->pStr == pNull) || (*(pData->pStr) == 0))    // if string is null or empty
        {
        pRect->size.w = pRect->size.h = 0;  // zero size
        return(stsOK);
        } pRect->origin = pData->location;                        // start with same origin
    OCall(msgFWinGetSDC, pData->manager, &dc);              // get the DC
    OCall(msgSdcSetFont, dc, &pData->style.fontInfo);       // set the font on the dc /* set up the text metrics */
    memset(&tx, 0, sizeof(SYSDC_TEXT_OUTPUT));              // clear text struct
    tx.pText = pData->pStr;
    if (length == 0)
        {
        tx.lenText = pData->length;
        }
    else
        {
        tx.lenText = length;
        }
    tx.alignChr = sysDcAlignChrBaseline;                    // baseline
    tx.stop = maxS32;                                       // no stop
    tx.spaceChar = 32;                                      // regular space
    tx.cp.x = tx.cp.y = 0;                                  // set initial position
    OCallNo(msgDcMeasureText, dc, &tx);

/* convert the text length to INTL */
    OCallNo(msgSdcLUCtoINTL_WSCALAR, dc, &tx.cp.x);         // length
    pRect->size.w = tx.cp.x;                                // set the width of the boundRect /* get the height of the boundRect from the font metrics */
    OCallNo(msgDcGetFontMetrics, dc, &fm);                  // get font metrics
    pRect->size.h = fm.maxY - fm.minY;                      // ht = ascender - descender ht
    OCallNo(msgSdcLUCtoINTL_HSCALAR, dc, &pRect->size.h);   // convert height to INTL /* now correct the origin for the descender */
    descenderHt = fm.minY;
    OCallNo(msgSdcLUCtoINTL_HSCALAR, dc, &descenderHt);     // convert descender height
    pRect->origin.y -= descenderHt;                         // correct the origin for decenders
    pRect->origin.y -= pRect->size.h;                       // switch to upper left rect origin /* now correct for right or centered alignment */
    if (pData->style.alignment == DVLABEL_RIGHT_ALIGN)
        {
        pRect->origin.x += (pData->clipRect.size.w - pData->boundRect.size.w - (2 * BrMakeFixed(5,0)));
        }
    else if (pData->style.alignment == DVLABEL_CENTER_ALIGN)
        {
        pRect->origin.x += ((pData->clipRect.size.w - pData->boundRect.size.w - (2 * BrMakeFixed(5,0))) / 2);
        } return(stsOK);
```

```
        )              // end of StringMeasure
/*------------------------------------------------------------------------
** CombMeasureCharWidth
**----------------------------------------------------------------------*/

STATUS LOCAL CombMeasureCharWidth(P_STRING pCombStr, SYSDC dc, P_U32 pWidth)
    {
    SYSDC_TEXT_OUTPUT    tx;

*pWidth = 0;

if ((pCombStr == pNull) || (*(pCombStr) == 0))  // if string is null or empty
        {
        return(stsOK);
        }

// assume caller has already set the dc up appropriately
    // in particular the font info is set /* set up the text metrics */
    memset(&tx, 0, sizeof(SYSDC_TEXT_OUTPUT));       // clear text struct
    tx.pText = pCombStr;
    tx.lenText = strlen(pCombStr);
    tx.alignChr = sysDcAlignChrBaseline;             // baseline
    tx.stop = maxS32;                                // no stop
    tx.spaceChar = 32;                               // regular space
    tx.cp.x = tx.cp.y = 0;                           // set initial position
    OCallNo(msgDcMeasureText, dc, &tx);

/* convert the text length to INTL */
    OCallNo(msgSdcLUCtoINTL_WSCALAR, dc, &tx.cp.x);// length
    *pWidth = tx.cp.x;                              // set the width of the boundRect
    return(stsOK);
    }                // end of CombMeasureCharWidth
/*------------------------------------------------------------------------
** DirtyCursor
**----------------------------------------------------------------------*/

STATUS LOCAL DirtyCursor(U16 cursorPos, P_INST pData)
    {
    STATUS  s;
    OBJECT  dc;
    RECT32  stringBounds, cursorBounds;

OCallRet(msgFWinGetSDC, pData->manager, &dc);    // get the dc
    if (cursorPos != 0)
        {
        StringMeasure(pData, &stringBounds, cursorPos);
        }
    else
        {
        stringBounds.size.w = 0;
        }
    OCallNo(msgDcSetLineThickness, dc, (P_ARGS)MakeU32(0,1));
    cursorBounds.origin.x = pData->boundRect.origin.x + stringBounds.size.w;
    cursorBounds.origin.y = pData->boundRect.origin.y;
    cursorBounds.size.w = 0x10000;
    cursorBounds.size.h = pData->boundRect.size.h;
    OCall(msgSdcDirtyRect, dc, &cursorBounds);
    return(stsOK);
    }                // end of DirtyCursor
```

We claim:

1. A device for input of data comprising:

a display for receiving input of data and for displaying said data;

a field generator for generating a plurality of fields, each of said fields for receiving, and for being associated with, a respective block of said data;

a data entry device for entering a respective block of said data in each of said plurality of fields in an original ink form;

a translator for generating a translated form of each respective block of said data from said original ink form of said respective block of said data;

a mode enabler for causing said display to display, in each of said fields, said respective block of data associated with said field in one of (a) a first display mode where said respective block of said data is in said original ink form and (b) a second display mode where said respective block of said data is in said translated form;

a mode selector for selecting said display mode; and memory for retaining a respective block of said data in said original ink form whenever said respective block of said data is displayed in said second display mode.

2. The device of claim 1 wherein said display comprises a display of a computer system.

3. The device of claim 1 wherein said display is a pen sensitive display of a computer system.

4. The device of claim 1 wherein said data entry device comprises a pen.

5. The device of claim 1 wherein said data is comprised of one or more strokes.

6. The device of claim 5 wherein said translator comprises a generator for generating machine readable characters from said strokes.

7. The device of claim 6 wherein said machine readable characters comprise Unicode characters.

8. The device of claim 6 wherein said machine readable characters comprise ASCII characters.

9. The device of claim 1 wherein said mode selector determines said display mode by a user input.

10. The device of claim 1 wherein said memory retains a respective block of said data in said translated form whenever said respective block of said data is displayed in said first display mode.

11. The device of claim 1 further comprising an error detecting means for detecting errors in said translated form of a respective block of said data said errors arising from one of (a) the device's inability to translate the original ink form of said respective block of said data and (b) the device's inability to match said translated form of said respective block of said data to data in a dictionary.

12. The device of claim 11, wherein said mode selector comprises:

a mode decider for causing said display to display a respective block of said data in said second display mode when said respective block of said data contains no errors and for causing said display to display said respective block of said data in said first mode when said respective block of said data contains errors.

13. The device of claim 1 further comprising:

identifying means for identifying said original ink form of said respective block of said data;

targeting means for identifying a target field of said original ink form of said respective block of said data.

14. The device of claim 13 wherein, when there is a boundary of said original ink form of said respective block of said data, and a boundary of each of said plurality of fields, said targeting means identifies said target field of said original ink form of said respective block of said data by comparing said boundary of said original ink form of said respective block of said data with said boundary of each of said plurality of fields, and identifying said target field as one of said plurality of fields whose said boundary is overlapped by at least a predetermined percentage of area of said boundary of said original ink form of said respective block of said data.

15. A method for input of data comprising the steps of:

receiving input of data and displaying said data;

generating a plurality of fields, each field for receiving and being associated with a respective block of said data;

entering a respective block of said data in each of said plurality of fields in an original ink form comprising one or more strokes;

generating a translated form of a respective block of said data from said original ink form of said respective block of said data;

enabling, in each of said fields, said respective block of data associated with said field to be displayed in one of (a) a first display mode where said respective block of said data is in said original ink form and (b) a second display mode where said respective block of said data is in said translated form;

selecting said display mode; and retaining a respective block of said data in said original ink form whenever said respective block of said data is displayed in said second display mode.

16. The method of claim 15 wherein said step of receiving and displaying said respective block of said data is performed with a display of a computer system.

17. The method of claim 15 wherein said step of receiving and displaying said respective block of said data is performed with a pen-sensing display of a computer system.

18. The method of claim 15 wherein said step of entering said respective block of said data in said original ink form is performed with a pen.

19. The method of claim 15 wherein said step of generating said translated form of said respective block of said data comprises the step of generating machine readable characters from said strokes.

20. The method of claim 19 wherein said machine readable characters comprise Unicode characters.

21. The method of claim 19 wherein said machine readable characters comprise ASCII characters.

22. The method of claim 15 wherein said selection of said display mode is determined by a user input.

23. The method of claim 15 further comprising the step of retaining a respective block of said data in said translated form whenever said respective block of said data is displayed in said first display mode.

24. The method of claim 15 further comprising the step of detecting errors in said translated form of said respective block of said data, said errors arising from one of (a) inability to translate the original ink form of said respective block of said data and (b) inability to match said translated form of said respective block of said data to data in a dictionary.

25. The method of claim 24 further comprising the step of:

displaying a respective block of said data in said second display mode when said respective block of said data contains no errors and displaying said respective block of said data in said first mode when said respective block of said data contains errors.

26. The method of claim 15 further comprising the steps of:

identifying said original ink form of said block of said data;

identifying a target field of said original ink form of said block of said data.

27. The method of claim 26 wherein, when there is a boundary of said original ink form of said respective block of said data, and a boundary of each of said plurality of fields, said step of identifying said target field is performed by comparing said boundary of said original ink form of said respective block of said data with said boundary of each of said plurality of fields, and identifying said target field as one of said plurality of fields whose said boundary is overlapped by at least a predetermined percentage of area of said boundary of said original ink form of said respective block of said data.

28. A device for input of data comprising:

a display for receiving input of data and for displaying said data;

a field generator for generating a plurality of fields, each of said fields for receiving, and for being associated with, a respective block of said data;

a data entry device for entering a respective block of said data in each of said plurality of fields in an original ink form;

a translator for generating a translated form of a respective block of said data from said original ink form of said respective block of said data;

a mode enabler for causing said display to display, in each of said fields, said respective block of data associated with said field in one of (a) a first display mode where said respective block of said data is in said original ink form and (b) a second display mode where said respective block of said data is in said translated form; and a mode selector for selecting said display mode; wherein:

said display displays at least two of said blocks of said data in said first display mode.

29. A method for input of data comprising the steps of:

receiving input of data and displaying said data;

generating a plurality of fields each field for receiving and being associated with a respective block of said data;

entering a respective block of said data in each of said plurality of fields in an original ink form comprising one or more strokes;

generating a translated form of a respective block of said data from said original ink form of said respective block of said data;

enabling, in each of said fields, said respective block of data associated with said field to be displayed in one of (a) a first display mode where said respective block of said data is in said original ink form and (b) a second display mode where said respective block of said data is in said translated form;

selecting said display mode; and displaying at least two of said blocks of said data in said first display mode.

* * * * *

UNITED STATES PATENT AND TRADEMARK OFFICE
CERTIFICATE OF CORRECTION

PATENT NO. : 5,455,901
DATED : October 3, 1995
INVENTOR(S) : John Friend et al.

It is certified that error appears in the above-identified patent and that said Letters Patent is hereby corrected as shown below:

Column 6, lines 10-11, "U.S. patent application copending, commonly-assigned" should be --copending, commonly-assigned U.S. patent application--.

Column 6, lines 40-44, "U.S. patent application Ser. No. copending, commonly-assigned Ser. No. 07,795,009, filed Nov. 18, 1991, entitlted Method for Entering and Manipulating Spreadsheet Cell Data' assigned to the assignee of the present invention." should be --copending, commonly-assigned U.S. patent application Serial No. 07/795,009, filed Nov. 18, 1991 entitled "Method and Apparatus for Entering and Manipulating Spreadsheet Cell Data."--

Signed and Sealed this

Thirtieth Day of March, 1999

Attest:

Attesting Officer

Q. TODD DICKINSON

Acting Commissioner of Patents and Trademarks